US012429348B2

United States Patent
Bales et al.

(10) Patent No.: US 12,429,348 B2
(45) Date of Patent: Sep. 30, 2025

(54) ROAD ACCIDENT DETECTION AND AVOIDANCE USING BLOCKCHAIN

(71) Applicant: DISH Network L.L.C., Englewood, CO (US)

(72) Inventors: Sean Edward Bales, Cheyenne, WY (US); Christofer Michael Hardy, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 262 days.

(21) Appl. No.: 17/936,093

(22) Filed: Sep. 28, 2022

(65) Prior Publication Data

US 2024/0102817 A1 Mar. 28, 2024

(51) Int. Cl.
*G01C 21/34* (2006.01)
*G01C 21/36* (2006.01)
*G08G 1/01* (2006.01)

(52) U.S. Cl.
CPC ..... *G01C 21/3492* (2013.01); *G01C 21/3602* (2013.01); *G01C 21/3626* (2013.01);
(Continued)

(58) Field of Classification Search
CPC ............ G01C 21/3492; G01C 21/3602; G01C 21/3626; G01C 21/3667; G01C 21/3691;
(Continued)

(56) References Cited

U.S. PATENT DOCUMENTS 11,503,031 B1 * 11/2022 Hu ........................ H04L 67/1097
2005/0251324 A1 * 11/2005 Wiener ............ G08G 1/096844
701/414

(Continued)

FOREIGN PATENT DOCUMENTS

CN 108269425 A * 7/2018 ............. E01F 11/00
DE 102017212728 A1 * 1/2019

OTHER PUBLICATIONS

Davydov et al., Accident Detection in Internet of Vehicles using Blockchain Technology, Mar. 2, 2020, IEEE Xplore, 2020 International Conference on Information Networking (ICOIN), 766-771 (Year: 2020).*

(Continued)

*Primary Examiner* — Ramya P Burgess
*Assistant Examiner* — Preston Jay Miller
(74) *Attorney, Agent, or Firm* — Baker Botts L.L.P.

(57) ABSTRACT

A system for road accident avoidance receives sensor data from computing devices associated with vehicles traveling on a road. The system communicates the sensor data to a blockchain network as blockchain records. The system determines that the sensor data includes an indication of a road accident. The system determines a location of the road accident from the sensor data. The system communicates, to the blockchain ledger, data that indicates the location of the road accident. The system identifies one or more vehicles within a threshold distance of the road accident that are traveling toward the road accident. The system communicates an alert signal that comprises the location of the road accident to each vehicle. The system determines a routing recommendation for each vehicle based on the location of the vehicle and the location of the road accident. The system communicates the routing recommendation to the vehicle.

20 Claims, 7 Drawing Sheets

(52) U.S. Cl.
CPC ..... *G01C 21/3667* (2013.01); *G01C 21/3691* (2013.01); *G08G 1/0133* (2013.01); *G08G 1/0141* (2013.01)

(58) Field of Classification Search
CPC ............ G01C 21/3415; G01C 21/3461; G08G 1/0133; G08G 1/0141; G08G 1/0112; G08G 1/164
USPC ........................................................ 701/423
See application file for complete search history.

(56) References Cited

U.S. PATENT DOCUMENTS

| | | | |
|---|---|---|---|
| 2014/0249735 A1* | 9/2014 | Levine ............... | G01C 21/3438 701/117 |
| 2017/0219365 A1* | 8/2017 | Zhou .................. | G01C 21/3469 |
| 2018/0137756 A1* | 5/2018 | Moosaei ............ | G08G 1/09675 |
| 2019/0303463 A1* | 10/2019 | Catalano ................ | G06F 16/22 |
| 2020/0226853 A1* | 7/2020 | Ahmed ................. | H04L 9/0618 |
| 2021/0304317 A1* | 9/2021 | Leise .................... | H04L 63/126 |
| 2022/0246035 A1* | 8/2022 | Garg ...................... | G07C 5/008 |
| 2022/0274593 A1* | 9/2022 | McFarland, Jr. .... | G08G 1/0133 |
| 2023/0005304 A1* | 1/2023 | Skaggs ................. | G07C 5/008 |
| 2023/0296390 A1* | 9/2023 | Davis ................ | G01C 21/3438 701/533 |

OTHER PUBLICATIONS

English translation of CN-108269425-A (Year: 2018).*
English translation of DE-102017212728-A1 (Year: 2019).*

* cited by examiner

ROAD ACCIDENT DETECTION AND AVOIDANCE USING BLOCKCHAIN

TECHNICAL FIELD

The present disclosure relates generally to signal processing, and more specifically to road accident detection and avoidance using blockchain.

BACKGROUND

When a vehicle is involved in an accident, drivers in vehicles further away from the accident are not aware of the accident and continue their intended traveling paths toward the accident. In some cases, this can lead to a chain of accidents or at least to congested traffic.

In some cases, congested traffic may cause network connection dead zones. For example, while people are stuck in traffic, they may want to make a phone call to others or use streaming services. In such situations, a number of subscribers to a serving cellular tower may become more than what the serving cellular tower can handle. In some cases, areas with limited network coverage may be dead zones. A device, such as a mobile device or a computing device is not able to connect to a cellular tower or a base station in dead zones.

SUMMARY

The system described in the present disclosure provides several practical applications and technical advantages that overcome the current technical problems as described herein. The following disclosure is particularly integrated into a practical application of improving the navigation of vehicles, whether they are wireless network-enabled or not, in situations of road accidents or generally any road anomaly such as extreme weather conditions. This, in turn, provides an additional practical application of providing safer driving conditions for vehicles and pedestrians. Furthermore, the disclosed system is integrated into an additional practical application of preserving video feeds that include evidence or indications of a road accident. These practical applications and technical advantages derived from them are described below.

Road Accident Detection and Avoidance

The disclosed system contemplates a system and a method configured for road accident detection and avoidance. In an example scenario, assume that vehicles are traveling on a road. Each vehicle may include sensors that are configured to detect the location, trajectory, and speed of the vehicle. Some vehicles may be autonomous, some vehicles may be manual (i.e., non-autonomous), and other vehicles may have any level of assistance driving. Some vehicles may be associated with computing devices that have wireless communication capability and some vehicles may not have wireless communication capability.

A vehicle capable of wireless communication capability may transmit sensor data to a serving base station in a serving cell of the vehicle. The sensor data may include location, speed, trajectory, temperature data, proximity data, collision data, a video feed showing a part of the road, and/or any other sensor data captured by the sensors of the vehicle. The disclosed system captures the sensor data from the computing device onboard the vehicle. Similarly, the disclosed system may capture multiple sensor data from multiple computing devices onboard multiple vehicles that have wireless communication capability.

The disclosed system may transmit the received sensor data to a blockchain network as blockchain records or data entries to be stored in a blockchain ledger. The blockchain ledger may grow as new incoming sensor data are transmitted from vehicles. In this manner, the disclosed system may build up the blockchain ledger that includes blocks of data (e.g., the sensor data) that form a blockchain.

The blockchain ledger is distributed among network nodes in the blockchain network. Each network node in the blockchain network stores a copy of the blockchain ledger upon reaching a consensus about the state of the blockchain ledger. This process provides a technical advantage that increases the security and reliability of the sensor data received from the vehicles. Since the blockchain ledger is distributed among the network nodes, it is practically impossible to tamper with the sensor data stored in the blockchain ledger.

Furthermore, if sensor data in one block in the blockchain is tampered with, the hash value of the block and hash values of the following blocks may change because the blocks are linked chronologically. This is because the hash of each block is determined based on the data stored in that block and preceding blocks. Therefore, tampering with sensor data stored in one block may cryptologically invalidate the hash of that block, which in turn, invalidates the blockchain. In this manner, the security and authenticity of the sensor data stored in the blockchain ledger are improved. This is particularly useful in cases when a piece of sensor data includes evidence of a road accident that may be used as proof for investigating the accident.

The disclosed system may analyze the sensor data stored in the blockchain ledger to detect indications of road accidents. In response to detecting an indication of a road accident in the sensor data, the disclosed system is configured to transmit an alert signal to computing devices associated with vehicles that are within a threshold distance from the road accident and are traveling toward the road accident. The alert signal may include the location of the road accident and traffic caused by the road accident. The alert signal may also include instructions to move to a side of a road to make room for law enforcement and emergency vehicles to pass.

The disclosed system is configured to determine a routing recommendation for each vehicle within a threshold distance from the road accident. In this process, the disclosed system may use the blockchain ledger to determine the location of each vehicle, and the traffic, movements, speed, and trajectories of the vehicles. The disclosed system may determine a routing recommendation for each vehicle based on its location, the traffic, and the location of the road accident, such that the routing recommendation leads to minimizing unsafe driving and road hazard conditions on the road. For example, the routing recommendation may include taking a detour, pulling over, passing by a road accident, etc.

As mentioned above, the disclosed system is also configured to improve the navigation of vehicles even if they do not have wireless communication capability. The disclosed system is configured to provide a road map monitoring device access to the blockchain ledger.

The road map monitoring device may be configured to provide a road map navigation software application that shows a map of a road on a graphical user interface and display traffic information associated with the map of the city on the road map navigation software application. In response to gaining access to the blockchain ledger, the road map monitoring device may update the traffic information of the road on the road map navigation software application according to the road accident from the blockchain ledger.

The road map monitoring device may also update turn-by-turn routing recommendations on the road map navigation software application pertinent to the road accident from the blockchain ledger. Drivers of vehicles may use the road map navigation software application to receive and follow a turn-by-turn driving route that is updated pertinent to the road accident from the blockchain ledger. In this manner, the disclosed system may improve the navigation of vehicles that do not have wireless communication capability.

In one embodiment, a system for road accident avoidance comprises a network interface and a process. The network interface is configured to receive first sensor data from a primary vehicle traveling on a road, wherein the first sensor data provides information about the road and the primary vehicle. The processor is operably coupled with the network interface. The processor communicates the first sensor data to a blockchain network as a blockchain record to be stored in a blockchain ledger, such that the first sensor data is distributed among a plurality of network nodes within the blockchain network, wherein each network node from among the blockchain network node stores a copy of the blockchain ledger. The processor determines that a particular sensor data from among the first sensor data comprises an indication of a road accident. The processor determines a location of the road accident from the first sensor data, wherein the location of the road accident is associated with the location of the primary vehicle included in the first sensor data. The processor communicates to the blockchain ledger data that indicates the location of the road accident. The processor identifies one or more vehicles within a threshold distance from the determined location of the road accident, wherein the identified one or more vehicles are traveling toward the road accident. The processor communicates an alert signal that comprises the determined location of the road accident to the one or more identified vehicles. For a first vehicle from among the one or more vehicles, the processor determines a location of the first vehicle on the road. The processor determines, based at least in part upon the location of the first vehicle and the location of the road accident from the blockchain ledger, a routing recommendation for the first vehicle. The processor communicates the routing recommendation to the first vehicle.

Peer-to-Peer Network of Wireless Fidelity (WiFi)-Enabled Vehicles for Data Transmission Using Blockchain The disclosed system contemplates a system and a method configured for forming a peer-to-peer network of WiFi-enabled vehicles using blockchain, and therefore network load balancing using the WiFi-enabled vehicles. In an example scenario, assume that vehicles are traveling along a road, and a computing device associated with one of the vehicles becomes unsuccessful in communicating with a serving base station. For example, assume that due to high network traffic to the base station, the base station becomes overloaded or oversubscribed. This leads to the base station becoming unable to receive any further network traffic. In such cases, using the existing technology, a person inside the vehicle who is initiating the communication with the base station will have to wait until the base station can accept new incoming network traffic. Currently, there is no technical solution to establish communication between the computing device associated with the vehicle and a base station. Furthermore, in some cases, one or more neighboring base stations may be able to accept incoming network traffic. This leads to network load unbalance across overloaded base stations and one or more neighboring base stations. Currently, there is no technical solution to balance the network load and network traffic across overloaded base stations and one or more neighboring base stations—i.e., to reduce network traffic congestion at overloaded base stations.

The disclosed system is configured to provide technical solutions to these technical problems by forming a peer-to-peer network of vehicles that are WiFi-enabled for data transmission. In certain embodiments, the vehicles in the peer-to-peer network of vehicles may be configured to use any wireless protocols, such as WiFi, Bluetooth, Zigbee, local area network (LAN), any short wave protocol (e.g., wireless protocols using short wave frequency bands), any long wave protocol (e.g., wireless protocols using long wave frequency bands), and the like for data transmission. For example, in response to determining that communication between the computing device associated with a vehicle and a serving base station is not established, the computing device associated with the vehicle is configured to identify a WiFi-enabled vehicle within a WiFi communication range and a base station that is not overloaded, and transmit data packets to the WiFi-enabled vehicle. The WiFi-enabled vehicle then may forward the data packet to a base station that is not overloaded. In another example, the computing device associated with the vehicle may transmit the data packet through one or more hops (e.g., via one or more WiFi-enabled vehicles) until the data packet reaches a designated base station. To this end, the disclosed system establishes a blockchain ledger that includes vehicle data, base station health data, and historical communication data.

In another example, in response to determining that communication between the computing device associated with a vehicle and a serving base station is not established, the computing device associated with the vehicle is configured to identify a wireless communication-enabled (i.e., network-enabled) vehicle within a threshold communication range and a base station that is not overloaded, and transmit data packets to the network-enabled vehicle. The network-enabled vehicle then may forward the data packet to a base station that is not overloaded. In another example, the computing device associated with the vehicle may transmit the data packet through one or more hops (e.g., via one or more network-enabled vehicles) until the data packet reaches a designated base station.

The disclosed system shares the blockchain ledger with computing devices associated with vehicles. The vehicle data stored in the blockchain ledger may include locations and WiFi capability indicators for the vehicles. The base station health data stored in the blockchain ledger may indicate whether a particular base station is overloaded or not. The historical communication data stored in the blockchain ledger may include records of communications between vehicles and base stations with timestamps of established communications. Since the blockchain ledger is shared among the vehicles, when a base station becomes unavailable to a vehicle, the vehicle (or the computing device associated with the vehicle) is able to access the blockchain ledger and identify the WiFi-enabled vehicles, their locations, base stations that are not overloaded, and their locations from the blockchain ledger.

The disclosed system is configured to establish the blockchain ledger by implementing a peer-to-peer network orchestrator device. The peer-to-peer network orchestrator device also generates a security token for each vehicle and stores each security token linked to the particular vehicle in the blockchain ledger. The security tokens may be used for authenticating a vehicle that requests to join a peer-to-peer network of vehicles for data transmission. In this manner, a vehicle that is not able to communicate with a base station is able to join a peer-to-peer network of vehicles (authorized by the peer-to-peer network orchestrator device) for data transmission.

Accordingly, the disclosed system is integrated into a practical application of forming a peer-to-peer mesh network of vehicles for data transmission. This, in turn, provides an additional practical application of establishing a network connection between a computing device associated with a vehicle (that is not able to connect with a serving base station) and a base station via one or more WiFi-enabled vehicles that form a peer-to-peer network. Furthermore, by forwarding data packets to a neighboring base station that is not overloaded, network congestion at overloaded base stations is reduced. This provides additional practical applications of reducing network congestion at base stations, network load balancing across multiple base stations, and improving network resource utilization across multiple base stations.

In one embodiment, a system for orchestrating a peer-to-peer network comprises a peer-to-peer network orchestrator device. The peer-to-peer network orchestrator device comprises a first processor configured to receive vehicle data from a plurality of computing devices associated with a plurality of vehicles traveling on a road, wherein particular vehicle data associated with a particular vehicle comprises at least one of a location or a wireless fidelity (WiFi) capability indicator for the particular vehicle. The first processor generates a plurality of security tokens for the plurality of vehicles. Each security token uniquely identifies a different vehicle from among the plurality of vehicles. A security token for a respective vehicle indicates that the respective vehicle is authorized to join a peer-to-peer network of vehicles for data transmission. The first processor establishes a blockchain ledger that comprises at least a portion of the vehicle data and the plurality of security tokens. The first processor transmits a copy of the blockchain ledger to the plurality of computing devices. The system also includes a first computing device associated with a first vehicle. The first computing device is from among the plurality of computing devices and is operably coupled with the peer-to-peer network orchestrator device. The first computing device comprises a second processor configured to receive, from the peer-to-peer network orchestrator device, the copy of the blockchain ledger. The second processor receives, from a second computing device associated with a second vehicle, a request to forward a data packet to a base station, wherein the request comprises the data packet and a first security token. The second processor determines that the first security token indicates that the second vehicle is authorized to join the peer-to-peer network. In response to determining that the first security token indicates that the second vehicle is authorized to join the peer-to-peer network. The second processor accepts the data packet from the second computing device. The second processor forwards the data packet to the base station.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions for road accident detection and avoidance. Furthermore, the previous technologies fail to provide efficient and reliable solutions for implementing a peer-to-peer network of vehicles for data transmission. Embodiments of the present disclosure and its advantages may be understood by referring to FIGS. 1 through 7. FIGS. 1 through 7 are used to describe systems and methods for road accident detection and avoidance, and systems and methods for implementing a peer-to-peer network of vehicles for data transmission.

Example System for Road Accident Detection and Avoidance

Figure 1:
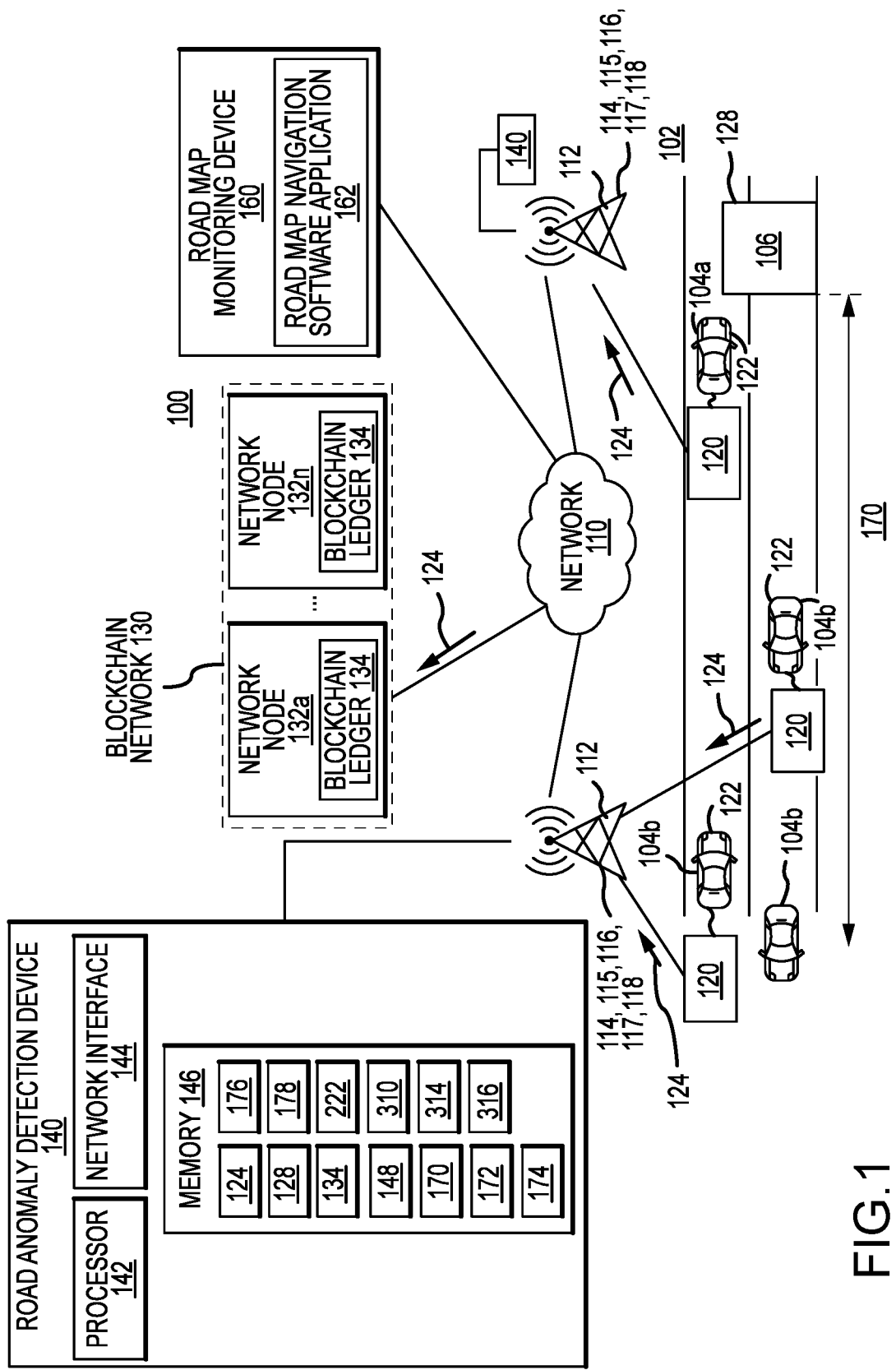
FIG. 1 illustrates an embodiment of a system configured for road accident detection and avoidance.

FIG. 1 illustrates an embodiment of a system 100 that is generally configured to detect road accidents (and other road anomalies, such as extreme weather conditions, road constructions, or any other anomaly that leads to unsafe driving conditions) and provide information to vehicles and drivers to avoid the road accidents (and other road anomalies). FIG. 1 further illustrates an example schematic of a road 102 where vehicles 104a, b are traveling and a primary vehicle 104a gets involved into a road accident 106. In certain embodiments, system 100 comprises a road anomaly detection device 140 communicatively coupled with a blockchain network 130, one or more base stations 112, one or more computing devices 120, and a road map monitoring device 160 via a network 110. Network 110 enables the communication between the components of the system 100. Road anomaly detection device 140 comprises a processor 142 in signal communication with a memory 146. Memory 146 stores software instructions 148 that when executed by the processor 142 cause the road anomaly detection device 140 to perform one or more functions described herein. For example, when the software instructions 148 are executed, the road anomaly detection device 140 determines that sensor data 124 (received from vehicles 104a, b) includes an indication of a road accident 106, identifies one or more vehicles 104 that are within a threshold distance 170 from the road accident 106 and are traveling toward the road accident 106, determine a routing recommendation 172 for each identified vehicle 104, communicate the routing recommendation 172 to the vehicle 104, communicate an alert signal 174 that comprises a location of the road accident 106 to the vehicles 104, and provide the road map monitoring device 160 access to the blockchain ledger 134. In other embodiments, system 100 may not have all of the components listed and/or may have other elements instead of, or in addition to, those listed above.

In an example scenario, assume that vehicles 104 are traveling along a road 102 and a primary vehicle 104a gets involved into a road accident 106. Drivers in vehicles 104 further away from the road accident 106 are not aware of the road accident 106 and proceed to travel toward the road accident 106. This scenario may lead to unsafe driving conditions and many vehicles 104 may abruptly stop or take unexpected maneuvers to avoid the obstruction on the road caused by the road accident 106, which further causes a chain of unexpected maneuvers by drivers behind them. In the existing technology, the road accident 106 is not addressed until a driver or a pedestrian reports the road accident 106 to law enforcement which may take serval minutes. Furthermore, due to the congested traffic caused by the road accident 106, law enforcement and emergency vehicles may have a difficult time reaching the road accident 106. The existing technology fails to provide a reliable and efficient solution to detect road accidents 106 and provide information about the road accident 106 to vehicles 104 to avoid the road accident 106.

The disclosed system 100 is configured to detect road accidents 106 and provide information about the road accident 106 to vehicles 104 to avoid the road accident 106 as described below. In an example operation, the disclosed system 100 (via the road anomaly detection device 140) receives sensor data 124 from vehicles 104 traveling on a road 102. The sensor data 124 may provide information about the vehicle 104 and the road 102. For example, the sensor data 124 may include location (e.g., Global Positioning System (GPS) location), speed, trajectory of the vehicle 104, and a video feed that shows at least a portion of the road 102.

The road anomaly detection device 140 may communicate the sensor data 124 to the blockchain network 130 as a blockchain transfer, data entry, or record 216 (see FIG. 2) to be stored in the blockchain ledger 134 and to be distributed among the network nodes 132a-n of the blockchain network 130. Since the sensor data 124 is distributed among the network nodes 132a-n, it is practically impossible to tamper with the distributed sensor data 124.

As shown in FIG. 1, the road anomaly detection device 140 may receive a plurality of sensor data 124 from a plurality of vehicles 104. In this manner, the road anomaly detection device 140 (e.g., via the blockchain ledger 134) may maintain a map of a road 102 (or any extent of a city) that shows vehicles 104 and their movements and behaviors (in real-time or near real-time). The map may be established from the blockchain records 216 (see FIG. 2) in the blockchain ledger 134. Therefore, if a vehicle 104 gets into a road accident 106, the road anomaly detection device 140 is configured to detect the road accident 106 from one or more sensor data 124 that include indications of the road accident 106. For example, the road anomaly detection device 140 may analyze the sensor data 124 received from a primary vehicle 104a (involved in an accident 106) and detect that an airbag in the vehicle 104a has deployed. In another example, the road anomaly detection device 140 may detect that sensor data 124 received from the primary vehicle 104a indicates an impact with an object. In another example, the road anomaly detection device 140 may analyze the sensor data 124 received from one or more secondary vehicles 104b (not involved in the road accident 106) and detect that the primary vehicle 104a has abruptly stopped on a road even though there is no stop sign, traffic, pedestrian crossing the road 102 in front of the primary vehicle 104a, or red traffic light. In another example, the road anomaly detection device 140 may analyze the sensor data 124 received from one or more secondary vehicles 104 (not involved in the road accident 106) and detect that the other vehicles 104 behind the primary vehicle 104 have abruptly stopped on a road even though there is no stop sign, traffic, pedestrian crossing the road 102 in front of the primary vehicle 104a, pedestrian crossing, or red traffic light. The road anomaly detection device 140 may use this information to detect the road accident 106. In response, the road anomaly detection device 140 may perform one or more actions to inform other vehicles 104 to avoid the road accident 106.

The system 100 is configured to provide information about the road accident 106 to vehicles 104 that have wireless communication capability. For example, the road anomaly detection device 140) may transmit an alert signal 174 to vehicles 104 (or computing devices 120 associated with those vehicles 104) that are heading toward the road accident 106 and are within a threshold distance 170 from the road accident 106. The vehicles 104 (either autonomous, semi-autonomous, or non-autonomous) may be navigated (manually or autonomously) to avoid the road accident 106.

The system 100 is further configured to provide information about the road accident 106 to vehicles 104 that do not have wireless communication capability. For example, the road anomaly detection device 140 may provide the road map monitoring device 160 access to the blockchain ledger 134. The road map monitoring device 160 may update traffic information on a road map navigation software application 162 according to the detected road accident 106. The road map monitoring device 160 may further update turn-by-turn routing recommendations 172 for vehicle 104 on the road map navigation software application 162 according to the detected road accident 106. In this manner, drivers in the vehicles 104 that do no have wireless communication capability receive information about the road accident 106 on the road map navigation software application 162, e.g., on their smartphones, mobile devices, and the like.

Accordingly, the system 100 is integrated into a practical application of improving the navigation of vehicles 104 whether or not they are wireless network-enabled, e.g., in situations of road accidents 106. This, in turn, provides an additional practical application of providing safer driving conditions. Furthermore, the system 100 is integrated into an additional practical application of preserving video feeds that include evidence or indications of a road accident 106. In this process, the system 100 (e.g., via the road anomaly detection device 140) instructs vehicles 104 to trigger sensor data 124, such as a video feed that is determined to include indications of a road accident 106 to become read-only. In this manner, the video feed showing the road accident 106 is guaranteed to be preserved and distributed in the blockchain network 130.

System Components

Example Vehicle

A vehicle 104 may be any vehicle configured to travel on a road 102. The vehicle 104 may be autonomous, semi-autonomous, or non-autonomous. In some cases, a vehicle 104 may not have wireless communication capability. For example, a driver of the vehicle 104 may manually drive the vehicle 104. For example, the driver may follow a routing recommendation provided by the road map navigation software application 162, e.g., installed on a user device, a smartphone, a mobile device, and the like.

In some cases, a vehicle 104 may have wireless communication capability. For example, a vehicle 104 may have a fifth generation (5G) communication interface, a near radio (NR) 5G communication interface, an LTE communication interface, and/or any other wireless protocol interfaces. The vehicle 104 may be in signal communication with other components of the system 100 via the base station 112 and/or network 110. Network 110 may be any suitable type of wireless and/or wired network. Network 110 may be a combination of one or more public and/or private networks, including a local area network (LAN), a metropolitan area network (MAN), a wide area network (WAN), and the like.

A vehicle 104 may include and/or be in signal communication with a computing device 120. A computing device 120 is generally any device that is configured to process data and interact with a driver. The computing device 120 may further be configured to provide autonomous driving, semi-autonomous driving, or any level of driving navigation assistance. Therefore, a vehicle 104 associated with a computing device 120 may be autonomous, semi-autonomous, or have any level of autonomy.

Examples of the computing device 120 include, but are not limited to, a personal computer, a desktop computer, a workstation, a server, a laptop, a tablet computer, or any other suitable type of device. The computing device 120 may include a user interface, such as a display, a microphone, keypad, or other appropriate terminal equipment usable by a driver. The computing device 120 may include a hardware processor 522 (see FIG. 5) operably coupled with a memory 526 (see FIG. 5) and a network interface 524 (see FIG. 5) configured to perform any of the functions or actions of the computing device 120 described herein. For example, a software application designed using software code 528 (see FIG. 5) may be stored in the memory 526 (see FIG. 5) and executed by the processor 522 (see FIG. 5) to perform the functions of the computing device 120. The computing device 120 is configured to communicate with other devices and components of the system 100 via the network 110.

A vehicle 104 may include and/or be operably coupled to sensors 122. Sensors 122 may be positioned at any location on or within the vehicle 104 to capture sensor data 124 that provides information about the surroundings of the vehicle 104. Examples of the sensors 122 may include, but are not limited to, a camera sensor, a temperature sensor, a proximity sensor, a motion sensor, a collision sensor, an airbag sensor, a speedometer sensor, a GPS location sensor, a light detection and ranging (LiDAR) sensor, a radar sensor, among other types of sensor. The sensors 122 may include any other type of sensor that is configured to facilitate the driving of a vehicle 104.

The camera sensor may be or include any camera that is configured to capture images and videos of a field of view in front of the camera. Examples of the camera sensor may include charge-coupled device (CCD) cameras and complementary metal-oxide semiconductor (CMOS) cameras, and the like. The camera sensor is a hardware device that is configured to capture images and videos continuously, at predetermined intervals, or on-demand. For example, as a vehicle 104 is traveling along the road 102, the camera sensor of the vehicle 104 may capture a video feed of at least a portion of the road 102 in the field of view of the camera sensor. The temperature sensor may be configured to detect the temperature of its surroundings. For example, in the case of a road accident 106, the temperature sensor may detect that the temperature of its surrounding has risen as a result of the collision. The motion sensor may be configured to detect locations and movements of objects within its field of detection. For example, as a vehicle 104 is traveling on a road 102, the motion sensor may detect the locations and movements of other vehicles, pedestrians, objects, traffic lights, traffic signs, etc. The collision sensor may be configured to detect whether a state of a vehicle 104 is a steady state or an accident state. For example, if a vehicle 104 is involved in an accident and has an impact with an object (e.g., another vehicle, a pedestrian, an object, etc.), the collision sensor reading (e.g., sensor data 124 captured by the collision sensor) may indicate that the state of the vehicle is an accident state. Otherwise, the collision sensor reading may indicate that the vehicle 104 is in a steady state. The airbag sensor may be configured to detect whether an airbag of a vehicle 104 is deployed or not. The speedometer may be configured to determine the speed of the vehicle 104. The GPS location sensor may be configured to determine a GPS location of the vehicle 104.

The sensors 122 are configured to capture sensor data 124. The sensor data 124 may include a video feed that shows at least a portion of a road 102 traveled by the vehicle 104, a location of the vehicle 104, a trajectory of the vehicle 104, the speed of the vehicle 104, locations of other vehicles 104 on the road 102, movements of other vehicles 104 on the road 102, trajectories of other vehicles 104 on the road 102, locations, movements, and trajectories of objects (e.g., pedestrians, etc.), and/or any other data/information.

The vehicles 104 associated with computing devices 120 may transmit sensor data 124 to a base station 112 (e.g., a cell tower). The vehicles 104 associated with computing devices 120 may transmit the sensor data 124 continuously, at predetermined intervals, or on demand. For example, a vehicle 104 may transmit the sensor data 124 every second, every five seconds, or any other suitable interval. In another example, a vehicle 104 may transmit the sensor data 124 to a base station 112 in response to receiving a request to transmit the sensor data 124 from the road anomaly detection device 140. The manner by which the vehicles 104 perform such operations is described in greater detail below, in the discussion of FIG. 3.

Base Station

Base station 112 may be a network node, an access point, an NB, an eNB, eNodeB, gNB or other types of wireless access points, and is generally configured to enable wireless communication between the components of the system 100. The base station 112 may serve communication to devices within a serving cell that defines a corresponding coverage area of the serving cell.

The base station 112 may be a serving base station for user equipment (UEs), user devices, mobile devices, collectively referred to herein as computing devices 120. When a computing device 120 is within a coverage area associated with a particular base station 112, the base station 112 provides communication coverage to the computing device 120. For example, as a vehicle 104 travels along the road 102, its computing device 120 may communicate sensor data 124 to its respective serving base station 112. As the vehicle 104 travels between cells, base stations 112 performs the handover procedure to hand over facilitating the communication of the computing device 120 associated with the vehicle 104.

In certain embodiments, the base station 112 may be configured to facilitate cellular networks, 4G, 5G, NR 5G, 3rd Generation Partnership Project (3GPP), and other wireless protocols. In certain embodiments, the base station 112 may include a road anomaly detection device 140. In certain embodiments, the base station 112 may also include a transceiver 114, a transmission filter 115, a receiving filter 116, memory resources 117, and processing resources 118 to facilitate operations of the base station 112, such as to transmit and receive sensor signals 124, mobile communication signals, and/or any other signals. For example, the transceiver 114 may include a processing circuitry configured to transmit signals (e.g., sensor data 124, mobile communication signals) to mobile devices, computing devices 120, other base stations 112, and to other communication systems to enable mobile communication and access to the network 110. The transmission filter 115 includes a bandpass filter with a strict passband. The passband corresponds to the bandwidth that is assigned for the base station 112. Any signals with frequencies outside the passband are filtered so that they are not transmitted from the base station 112. The receiving filter 116 includes a bandpass filter configured to ensure that the base station 112 will reject any signals outside of its designated bandwidth. Accordingly, the receiving filter 116 is a bandpass filter with a strict bandpass corresponding to the assigned bandwidth of the base station 112. The memory resources 117 include one or more computer-readable media that store software instructions for establishing a mobile communication network with the base station 112. The processing resources 118 may include one or more processing circuitry configured to execute the software instructions stored n the one or more computer-readable media of the memory resources 117 to perform wireless communication functions of the base station 112.

Road Anomaly Detection Device

Road anomaly detection device 140 generally includes a hardware computing device that is configured to detect road accidents (and any other kind of road anomalies) from sensor data 124. In certain embodiments, the road anomaly detection device 140 may be implemented by a cluster of computing devices located in a server farm. For example, the road anomaly detection device 140 may be implemented by a plurality of computing devices using distributed computing and/or cloud computing systems in a network of base stations 112. In certain embodiments, the road anomaly detection device 140 may be implemented by a plurality of computing devices in one or more data centers. The road anomaly detection device 140 may be formed by one or more physical devices configured to provide services and resources (e.g., data and/or hardware resources) for the components of the system 100, such as the blockchain network 130, road map monitoring device 160, and vehicles 104.

The road anomaly detection device 140 comprises a processor 142 operably coupled with a network interface 144 and a memory 146. Processor 142 may include one or more specialized and/or general-purpose processors configured to perform one or more operations of the road anomaly detection device 140 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 1 may be performed using one or more processors. As such, for example, functions of detecting road anomalies 106 and determining routing recommendations 174 may be performed by the processor 142. The processor 142 is configured to operate as described in FIGS. 1-4. For example, the processor 142 may be configured to perform one or more operations of method 400 as described in FIG. 4.

Network interface 144 is configured to enable wired and/or wireless communications. The network interface 144 communicatively couples the road anomaly detection device 140 to other devices, such as some or all of the components of the system 100. The network interface module 144 may communicate over any type of network topology and communication link. The network interface 144 is configured to transmit and receive data from and to other devices, for example, the network interface 144 may include a wireless fidelity (WiFi) modem, a WiFi interface, a fifth generation (5G) modem, a 5G interface, a near radio (NR) 5G modem, a NR 5G interface, a fourth generation (4G) modem, a 4G interface, a long term evolution (LTE) modem, a LTE interface, a local area network (LAN) modem, a LAN interface, a metropolitan area network (MAN) modem, a MAN interface, a wide area network (WAN) modem, WAN interface, and any other suitable type of communication protocol.

The memory 146 may include a machine-readable medium having stored thereon instructions which may be used to program a computer (or other electronic devices) to perform a process. The machine-readable medium may include, but is not limited to, floppy diskettes, optical disks, compact disc read-only memories (CDROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions and data. The memory 146 may store any of the information described in FIGS. 1-4 along with any other data, instructions, logic, rules, or code operable to implement the function(s) described herein when executed by processor 142. For example, the memory 146 may store software instructions 148, sensor data 124, road accident location 128, threshold distance 170, routing recommendations 172, alert signal 174, machine learning module 176, indications 310 of road accident 106, extent 314 of road accident 106, routing recommendation engine 178, extent 314 of the road accident 106, message 318, triggering instructions 316, access key 222, blockchain ledger 134, and/or any other data or instructions. The software instructions 148 may comprise any suitable set of instructions, logic, rules, or code operable to execute the processor 142 and perform the functions described herein, such as some or all of those described in FIGS. 1-7. Examples of the road accident 106 may include a collision between vehicles 104, a collision between an object (e.g., a road sign, a pedestrian, etc.) and a vehicle 104*a*, extreme weather, and road construction, among other road anomalies that lead to unsafe driving conditions.

The machine learning module 176 may be implemented by the processor 142 executing the software instructions 148 and is generally configured to determine whether a scene in a video feed 126 (see FIG. 3) (or sensor data 124) has indications of a road accident 106 or not. In certain embodiments, the machine learning module 176 may include a support vector machine, neural network, random forest, k-means clustering, Tree-based algorithm, Random Forest algorithm, etc. In certain embodiments, the machine learning module 176 may include image processing, object recognition, video processing algorithms, and the like. In certain embodiments, the machine learning module 176 may be implemented by an unsupervised, semi-supervised, or supervised machine learning algorithm. For example, the machine learning module 176 may be given a training dataset that comprises a plurality of sensor data 124 including images, videos, audio files, radar data, lidar data, point cloud data, temperature sensor data, proximity data, and/or other sensor data formats each labeled with a respective label that indicates if the sensor data indicates or associated with a road accident 106 or not.

The road anomaly detection device 140 may feed the training dataset to the machine learning module 176. In a training state, the machine learning module 176 learns the relationships and associations between each sensor data 124 and its respective label indicating if it is associated with a road accident 106. In this process, the machine learning module 176 may perform video, image, audio, lidar data, radar data, point cloud data, temperature sensor data, and proximity data augmentation to process each sensor data 124 from different aspects. For example, in image augmentation, the machine learning module 176 may rotate images and extract features of the images from different angles. The machine learning module 176 may determine the weight and bias values of a neural network based on the learned relationship between each sensor data and a respective road accident label.

In a testing stage, the machine learning module 176 is given a set of sensor data 124 unlabeled with road accident indication and is asked to predict whether each sensor data 124 is associated with a road accident. The machine learning module 176 may use the interpretation of sensor data 124 learned by analyzing the training dataset to predict whether each sensor data 124 is associated with a road accident. In a refining stage and a back propagation process, the bias and weight values of the neural network of the machine learning module 176 are updated to improve the accuracy of the prediction of the machine learning module 176. An operator may review the determination of the machine learning module 176 and update, override, or confirm it. The input from the operator may be used as feedback to the machine learning module 176 to improve the operation of the machine learning module 176 and accuracy in the determination of road accidents 106 from sensor data 124.

The routing recommendation engine 178 may be implemented by the processor 142 executing the software instructions 148 and is generally configured to provide a routing recommendation 172 for each vehicle 104a, b. In certain embodiments, the routing recommendation engine 178 may include a support vector machine, neural network, random forest, k-means clustering, Tree-based algorithm, Random Forest algorithm, etc. In certain embodiments, the routing recommendation engine 178 may include algorithms for simulating driving in various routes and trajectories. In certain embodiments, the routing recommendation engine 178 may be implemented by an unsupervised, semi-supervised, or supervised machine learning algorithm. For example, the routing recommendation engine 178 may be given a map of a road with movements of traffic and is asked to provide a routing recommendation for a vehicle approaching a road accident. The routing recommendation engine 178 may perform a plurality of driving simulations to determine a traveling path (i.e., the routing recommendation 172) that the traffic allows and leads to safer driving conditions.

The routing recommendation engine 178 may be configured to determine a routing recommendation 172 for each vehicle 104a, b based on the location of the vehicle 104a, b, the location of the road accident 106, the extent of the road accident 106, the traffic on the road 102, and vehicles 104b movements and driving patterns from the sensor data 124, and the blockchain ledger 134. An operator may review the routing recommendation 172 determined by the routing recommendation engine 178 and update, override, or confirm it. The input from the operator may be used as feedback to the routing recommendation engine 178 to improve the operation of the routing recommendation engine 178. The road anomaly detection device 140 (e.g., via the routing recommendation engine 178) may run or execute a plurality of simulations to determine a routing recommendation 172 that is suitable and executable for each respective vehicle 104b that leads to minimizing unsafe driving and road hazard conditions on the road 102.

Blockchain Network

Blockchain network 130 is a peer-to-peer network of network nodes 132a-n, and is generally configured to distribute sensor data 124 (and any other data/information) among the network nodes 132a-n In certain embodiments, blockchain network 130 is a public blockchain network. In certain embodiments, blockchain network 130 is a private blockchain network. For example, membership in blockchain network 130 may be limited to nodes 132 registered as belonging to and/or affiliated with the organization to which road anomaly detection device 140 belongs and/or affiliated with the organization to which the peer-to-peer network device 540 (see FIG. 5) belongs. In certain embodiments, the road anomaly detection device 140 may be a member of blockchain network 130 (e.g., as nodes 132 in blockchain network 130). In certain embodiments, the peer-to-peer network device 540 (see FIG. 5) may be a member of blockchain network 130 (e.g., as nodes 132 in blockchain network 130).

Figure 2:
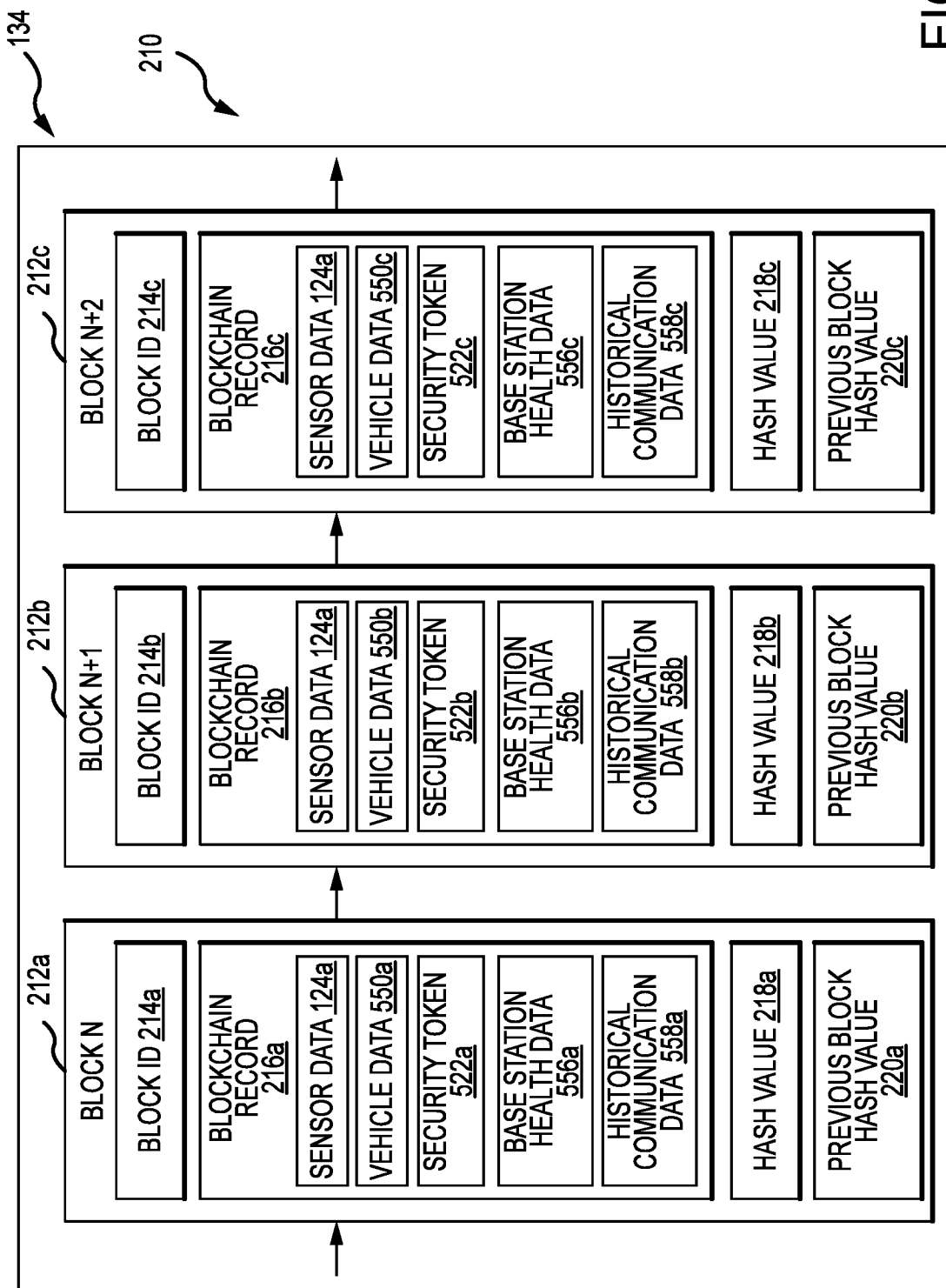
FIG. 2 illustrates an example embodiment of a blockchain network of system of FIG. 1.

The blockchain network 130 may comprise any number of network nodes 132 to form a distributed network that maintains a blockchain 210 (see FIG. 2). Each network node 132 may comprise a computing device, a virtual machine, a server, a work station, and/or the like. Each network node 132a through 132n of blockchain network 130 stores a blockchain ledger 134 configured to store a copy of a blockchain 210 (see FIG. 2).

Each network node 132a through 132n may be an instance of a network node 132. The network node 132 may include a hardware processor, memory, and/or circuitry (not explicitly shown) configured to perform any of the functions or actions of the network node 132 described herein. For example, a software application designed using software code may be stored in the memory and executed by the processor to perform the functions of the network node 132. The network node 132 is configured to communicate with other devices and components of the system 100 via the network 110.

Referring to FIG. 2, the blockchain 210 generally refers to a distributed database shared by a plurality of devices or network nodes 132 in a network. The blockchain ledger 134 stores the blockchain 210. The blockchain 210 comprises blocks 212 which contain every blockchain record 216 executed in the network. For example, the blockchain 210 includes a set of blockchain records 216a-c executed in blockchain network 130 of FIG. 1.

In certain embodiments, a blockchain 210 is a continuously growing list of records, called blocks such as blocks 212a-c, which are linked and secured using cryptography. Each block typically contains block ID 214a-c, blockchain records or data entries 216a-c, a cryptographic hash, such as a hash 218a-c of the block 212a-c and a previous hash 220a-c of the previous block 212a-c, a timestamp, and information derived from a preceding block 212a-c. By design, a blockchain 210 is inherently resistant to modification of the data. In certain embodiments, the blockchain 210 may be associated with an open, distributed ledger 134 that can record blockchain data entries 216a-c efficiently and in a verifiable and permanent way. Once recorded, the blockchain data entries 216a-c in any given block cannot be altered retroactively without the alteration of all subsequent blocks 212a-c. In certain embodiments, a blockchain record or data entry 216a-c may include some or all of sensor data 124a-c, vehicle data 550a-c, security token 552a-c, base station health data 556a-c, historical communication data 558a-c, in addition or instead of any other data described herein.

For example, the blockchain data entry 216a-c includes information such as (a) metadata of sensor data 124a-c that is being shared, (b) an ID of an entity that initiates the blockchain data entry 216a-c, and (c) an ID of an entity that receives the blockchain data entry 216a-c. The metadata of the sensor data 124a-c can include any information associated with the sensor data 124a-c such as a location from which the sensor data 124 is captured or originated, a vehicle 104 that transmitted the sensor data 124a-c, a type of the sensor data 124a-c, indications 310 of road accident 106 (if any), location of the road accident 106, and/or any other data/information. Each block 212a-c in a blockchain 210 can have such details. Each of the sensor data 124a-c may be associated with a different vehicle 104a, b (see FIG. 1). The operation of storing and distributing the sensor data 124a-c in blockchain ledger 134 among the network nodes 132 is described in greater detail in FIG. 3.

When a new sensor data 124 is received, the blockchain network 130 and/or the road anomaly detection device 140 (see FIG. 1) add a new data entry to the blockchain 210 as a block 212 after computing a hash 218 for the new data entry, validating the new data entry, e.g., by broadcasting the new data entry to a peer-to-peer network of nodes 132 (see FIG. 1), encrypts the validated data entry, and adds the validated data entry to the blockchain 210.

Figure 5:
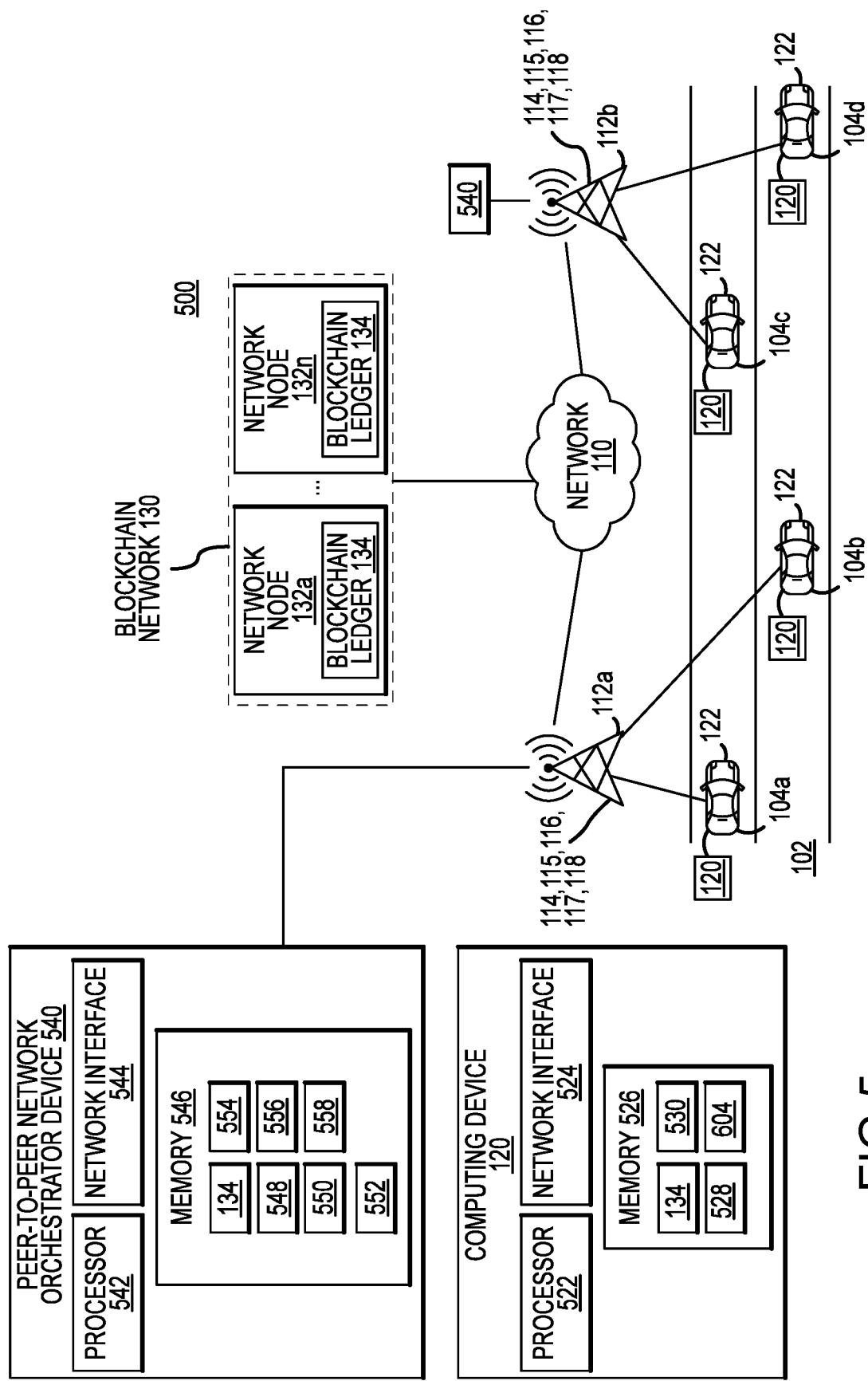
FIG. 5 illustrates an embodiment of a system configured for implementing a peer-to-peer network of vehicles for data transmission.

Similarly, each of the vehicle data 550a-c may be associated with a different vehicle 104a-d (see FIG. 5), each of the security tokens 552a-c may be associated with a different vehicle 104a-d (see FIG. 5), each of the base station health data 556a-c may be associated with a different base station 112 (see FIG. 5), each of the historical communication data 558a-c may be associated with a different vehicle 104a-d, (see FIG. 5). Generally, a new blockchain record or data entry 216a-c may be referred to any of the sensor data 124a-c, vehicle data 550a-c, security token 552a-c, base station health data 556a-c, and historical communication data 558a-c.

When a new blockchain data entry 216 is received, the blockchain network 130 and/or the road anomaly detection device 140 (see FIG. 1), and/or the peer-to-peer network orchestrator device 540 (see FIG. 5) add a new a block 212 after computing a hash 218 for the new blockchain data entry 216, validating the new blockchain data entry 216, e.g., by broadcasting the new blockchain data entry 216 to a peer-to-peer network of nodes 132 (see FIG. 1), encrypts the validated blockchain data entry 216, and adds the validated blockchain data entry 216 to the blockchain 210.

The block 212 is added to the blockchain 210 and linked to the previous block 212 of the blockchain 210 by storing, in the block 212, a hash 220 of the previous block (e.g., last added block) in the blockchain 210. For example, to add the blockchain data entry 216c, the new data entry is sent to the peer-to-peer network for validation. peer-to-peer network consists of computers called as nodes 132a-n (see FIG. 1). The network of nodes validates the new data entry and the vehicle status using known algorithms. When a consensus is received, the new data entry is validated. Once validated, the new data entry is combined with other new data entries to create a new block of data, e.g., the third block 212c. The new data entry will be rejected and does not get linked to existing blocks in the blockchain 210 if the validation fails.

As described above, a hash 218 is generated for a block 212 prior to adding the block 212 to the blockchain 210. In certain embodiments, a hash 218 is a fingerprint of the block 212 and is always unique. Hash 220 of the previous block 212 is used to create chain of blocks and each block points to the previous block as illustrated in the blockchain 212. For example, to add the third block 212c to the blockchain 210, the blockchain network 130 and/or the road anomaly detection device 140 (see FIG. 1), and/or the peer-to-peer network orchestrator device 540 (see FIG. 5) links the third block 212c to the second block 212b by adding a hash of the second block 212b in the third block 212c. This type of linking ensures the blocks (e.g., data entries in the block) are secure. If a block is edited or tampered with, e.g., data in the block is changed, a new hash is created, and further blocks cannot point to the previous block as the new hash of the previous block and a hash of the previous block in the next block does not match. For example, if a hacker tries to change data (e.g., any of the blockchain records 216b) in the second block 212b, tampering with the data creates a new hash for the second block 212b. The new hash of the second block 212b and the original hash of the second block 212b stored in the third block 212c as previous hash do not match. This invalidates some or all of the blockchain. Accordingly, the blockchain 210 ensures that the data entries 216a-c are secure. In certain embodiments, the blockchain network 130 and/or the road anomaly detection device 140 (see FIG. 1) and/or the peer-to-peer network orchestrator device 540 (see FIG. 5) can generate separate blockchains for scenarios, locations, times of day, etc.

Referring back to FIG. 1, the blockchain network 130 is configured to establish consensus among the network nodes 132a-n about the present state of the blockchain ledger 134. For example, each network node 132a-n comprises a processor in signal communication with a memory storing software instructions that when executed by the processor, cause the network nodes 132a-n to implement a consensus protocol procedure through which all the network nodes 132a-n of the blockchain network 130 reach a common agreement about the present state of the blockchain ledger 134. In this way, each network node 132a-n achieves reliability in the blockchain network 130 and establishes trust between the network nodes 132a-n in a distributed computing environment. Essentially, the consensus protocol makes sure that every new block 212a-c (see FIG. 2) that is added to the blockchain 210 (see FIG. 2) is the one and only version of the truth that is agreed upon by all the block 212a-c (see FIG. 2) in the blockchain 210 (see FIG. 2).

Road Map Monitoring Device

Road map monitoring device 160 generally includes a computer system configured to provide the road map navigation software application 162 that shows a map of some or all part of a city (e.g., a portion including the roads 102) on a graphical user interface and display traffic information associated with the roads 102 on the road map navigation software application 162. In certain embodiments, the road map monitoring device 160 may be implemented by a cluster of computing devices located in a server farm. For example, the road map monitoring device 160 may be implemented by a plurality of computing devices using distributed computing and/or cloud computing systems in a network. The road map monitoring device 160 may include a hardware processor, memory, and/or circuitry (not explicitly shown) configured to perform any of the functions or actions of the road map monitoring device 160 described herein. For example, a software application designed using software code may be stored in the memory and executed by the processor to perform the functions of the road map monitoring device 160. The road map monitoring device 160 is configured to communicate with other devices and components of the system 100 via the network 110.

In certain embodiments, the road map monitoring device 160 may be associated with a third-party organization compared to the organization that the road anomaly detection device 140 is associated with. For example, the road map monitoring device 160 may be a Google Map™ server, a Waze™ server, a server associated with live traffic reporting news, a crowd-sourced traffic reporting server, and the like. In certain embodiments, the road map monitoring device 160 may be associated with a same organization as the road anomaly detection device 140.

Operational Flow for Road Accident Detection and Avoidance

Figure 3:
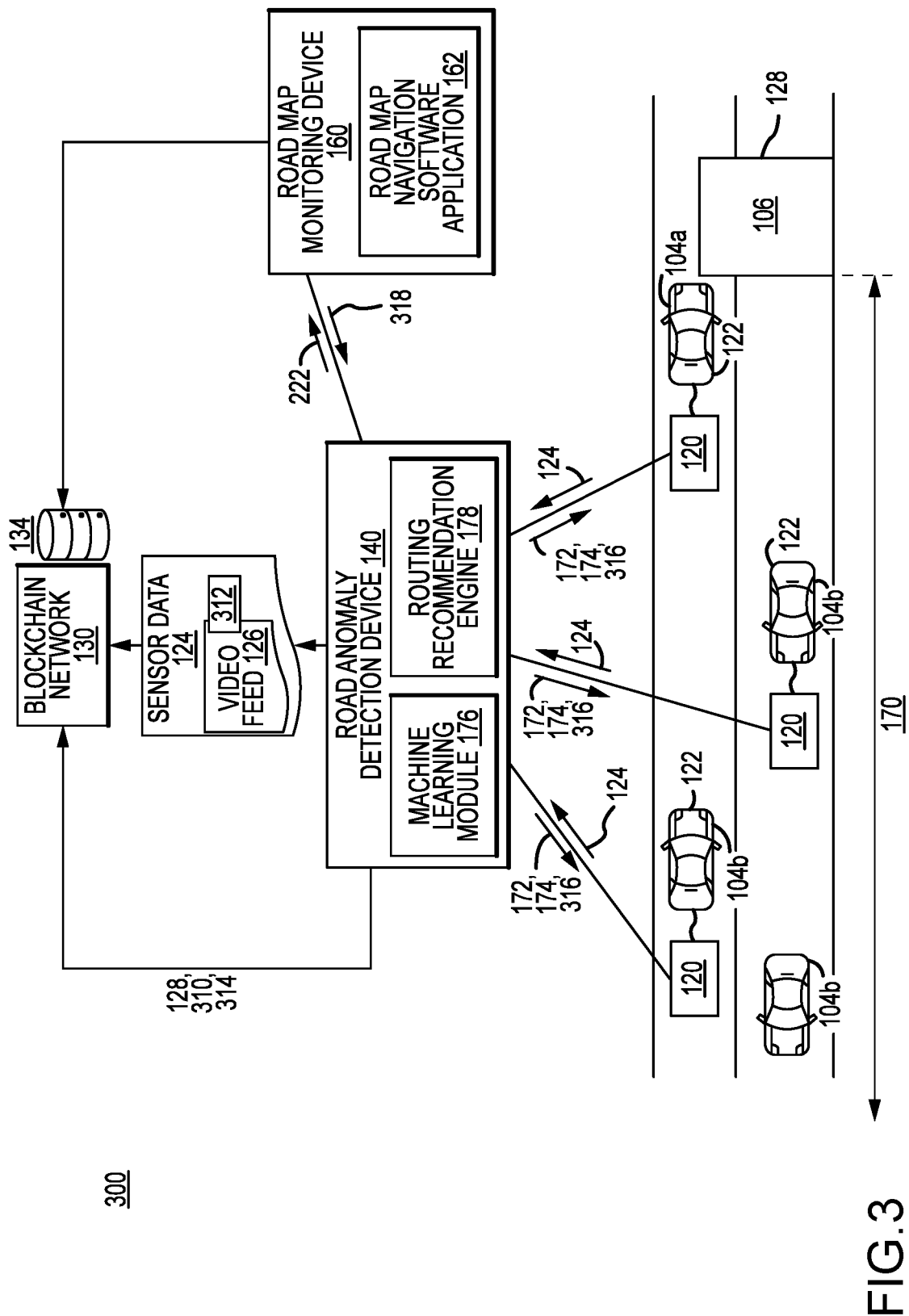
FIG. 3 illustrates an example operational flow of system of FIG. 1 for road accident detection and avoidance.

FIG. 3 illustrates an example operational flow 300 of the system 100 (see FIG. 1) for road accidents 106 detection and avoidance. In an example operation, assume that a plurality of vehicles 104a, b are traveling on a road 102. At least some of the vehicles 104a, b may be associated with computing devices 120 for full autonomy, semi-autonomous, or any level of driving assistance, similar to that described in FIG. 1.

As the vehicles 104a, b travel on the road 102, sensors 122 of the vehicles 104a,b capture sensor data 124. The computing devices 120 transmit the sensor data 124 to the road anomaly detection device 140, e.g., via their serving base stations 112 and/or network 110, similar to that described in FIG. 1. The road anomaly detection device 140 receives the sensor data 124.

In certain embodiments, the road anomaly detection device 140 may generate and grow a blockchain ledger 134 associated with the road 102 that has information about the vehicles 104 on the road 102 along with other objects, the traffic, pedestrians, buildings, terrain, etc. The blockchain ledger 134 may include an ever-changing map that is updated from locations, movements, behaviors of the vehicles 104a,b and other objects observed by the sensors 122.

The road anomaly detection device 140 transmits the received sensor data 124 to the blockchain network 130 as a blockchain record 216a-c (see FIG. 2). The sensor data 124 is distributed among the network nodes 132a-c of the blockchain network 130 to form the distributed blockchain ledger 134. For example, with each new entry of sensor data 124 to the blockchain network 130, a new block 212a-c (see FIG. 2) may be added to the blockchain 210 (see FIG. 2).

The newly added block 212a-c (see FIG. 2) maybe created with a particular hash value 218a-c (see FIG. 2) based on information derived from a preceding block 212a-c (see FIG. 2), similar to that described in FIG. 2. In certain embodiments, the road anomaly detection device 140 may generate a new block 212a-c (see FIG. 2) using a hash value 218a-c (see FIG. 2) that is generated from the sensor data 124 received from a computing device 120. For example, the road anomaly detection device 140 may feed the incoming sensor data 124 to a hash function to generate a hash value 218a-c (see FIG. 2) for the new block 212a-c (see FIG. 2) that stores the incoming sensor data 124. The hash function may be applied to the numerical values of the incoming sensor data 124. Each incoming sensor data 124 may be linked to a preceding sensor data 124 pertinent to the chain of blockchains 210 (see FIG. 2) in the blockchain ledger 134. Therefore, it is practically impossible to tamper with the sensor data 124 in any of the blocks 212a-c (FIG. 2) because if a piece of sensor data 124 in any block 212a-c (FIG. 2) is changed, the hash values 218a-c (see FIG. 2) would be invalid. This leads to preserving the security, integrity, and authenticity of the sensor data 124 as evidence of road accident 106. In this manner, the road anomaly detection device 140 may build up and create a blockchain ledger 134.

Detecting an Indication of a Road Accident in Sensor Data

As the road anomaly detection device 140 receives the sensor data 124 from the computing devices 120, the road anomaly detection device 140 may analyze the received sensor data 124 to determine whether any indication 310 of a road accident 106 is included in the sensor data 124.

The road anomaly detection device 140 may determine that a particular sensor data 124 from among the sensor data 124 (received from the primary vehicle 104a alone or in combination with sensor data 124 received from one or more secondary vehicles 104b) comprises an indication 310 of the road accident 106. For example, the road anomaly detection device 140 may analyze the sensor data 124 received from a primary vehicle 104a and detect that an airbag sensor data 124 indicates that the airbag in the vehicle 104a has been deployed. In another example, the road anomaly detection device 140 may analyze the sensor data 124 received from the primary vehicle 104a and detect that the collision sensor data 124 received from the primary vehicle 104a indicates an impact by an object.

In another example, the road anomaly detection device 140 may analyze the sensor data 124 received from one or more secondary vehicles 104b (not involved in the road accident 106 and detect that the primary vehicle 104a has abruptly stopped on a road even though there is no stop sign, traffic, pedestrian crossing the road 102 in front of the primary vehicle 104a, or red traffic light. In this example, the sensor data 124 received from one or more secondary vehicles 104b may include proximity information, movement information, and GPS location information about the primary vehicle 104a that has involved in the road accident 106. The proximity information may indicate a distance of a secondary vehicle 104b from the primary vehicle 104a. The movement information may indicate movements, speed, and trajectory of the primary vehicle 104a. The GPS location information may indicate the GPS location coordinates of the primary vehicle 104a (in real-time or near real-time). Based on analyzing the sensor data 124 received from the one or more secondary vehicles 104b, the road anomaly detection device 140 may determine that the proximity information, movement information, and/or GPS location information associated with the primary vehicle 104a indicate that the primary vehicle 104a has abruptly stopped on the road 102 where there is no stop sign, traffic, pedestrian crossing the road 102 in front of the primary vehicle 104a, or red traffic light. Further in this example, the sensor data received from the one or more secondary vehicles 104b may indicate that the primary vehicle 104a was traveling toward a particular direction and trajectory at time t−1, and suddenly the primary vehicle 104a is traveling toward a different direction (e.g., the opposite direction compared to the particular direction) at time t. The unexpected change of trajectory of the primary vehicle 104a to the opposite direction may indicate an impact with an object forcing the primary vehicle 104a to move backward. The road anomaly detection device 140 may also detect such unexpected change of the trajectory of the primary vehicle 104a from sensor data 124 received from the primary vehicle 104a.

In another example, the road anomaly detection device 140 may analyze the sensor data 124 received from one or more secondary vehicles 104b (not involved in the road accident 106 and detect that the other vehicles 104b behind the primary vehicle 104a have abruptly stopped on a road 102 even though there is no stop sign, traffic, pedestrian crossing the road 102 in front of the primary vehicle 104a, or red traffic light.

In another example, the road anomaly detection device 140 may analyze the sensor data 124 received from one or more secondary vehicles 104b (not involved in the road accident 106 and detect that the other vehicles 104b behind the primary vehicle 104a are taking an exit, a detour, a U-turn, or pulled over to a side of the road 102.

In another example, the road anomaly detection device 140 may analyze the sensor data 124 received from one or more secondary vehicles 104b (not involved in the road accident 106) and detect traffic behind the primary vehicle 104a even if there is no stop sign or red traffic light ahead.

In another example, the road anomaly detection device 140 may analyze the sensor data 124 received from one or more secondary vehicles 104b (not involved in the road accident 106) and detect that the primary vehicle 104a has stopped on the road 102 and some vehicles 104b are passing by around the primary vehicle 104a. The road anomaly detection device 140 may use some or all these indications 310 in the sensor data 124 to detect the road accident 106. In other words, the road anomaly detection device 140 may detect the road accident 106 based on driving behaviors and patterns associated with primary vehicle 104a and secondary vehicles 104b. For example, the road anomaly detection device 140 may receive a second sensor data 124 from one or more secondary vehicles 104b that have witnessed the road accident 106 (e.g., from vehicles 104b that are within a threshold distance from the road accident 106 and/or the road accident 106 is detected by the sensors 122 of those vehicles 104b). The sensor data 124 received from the one or more secondary vehicles 104b may include one or more indications 310 of the road accident 106, including the examples described above, such as at least one vehicle 104b has stopped behind the road accident 106 at a location where there is no traffic, stop sign, red traffic light, or pedestrian crossing, at least one vehicle 104b has slowed down at a location where there is no traffic, stop sign, red traffic light, or pedestrian crossing, and at least one vehicle 104b has taken a detour to avoid the road accident 106.

The road anomaly detection device 140 may analyze the sensor data 124 received from the one or more secondary vehicles 104b and the primary vehicle 104a. The road anomaly detection device 140 may determine the extent 314 of the road accident 106. For example, the extent 314 of the road accident 106 may be an area occupied by the vehicle 104a and any other object or vehicle involved in the road accident 106 optionally in addition to an area occupied by traffic caused as a result of the road accident 106 (if any).

The road anomaly detection device 140 may associate or link the data indicating the extent 314 of the road accident 106 to the particular sensor data 124 from among the sensor data 124 (received from the primary vehicle 104a alone or in combination with sensor data 124 received from one or more secondary vehicles 104b) comprises an indication 310 of the road accident 106. The road anomaly detection device 140 may communicate the second sensor data 124 as a second blockchain record 216a-c (see FIG. 2) to the blockchain network 130 to be stored in the blockchain ledger 134. In this manner, the road anomaly detection device 140 may detect the road accident 106 in the sensor data 124 received from the primary vehicle 104a (that is involved in the road accident 106) and from one or more secondary vehicles 104b (that are not involved in the road accident 106). The road anomaly detection device 140 may include the detected indications 310 of the road accident 106 in the blockchain ledger 134 and update the blockchain ledger 134 distributed in the blockchain network 130.

The road anomaly detection device 140 may determine a location 128 of the road accident 106 from the sensor data 124. The road anomaly detection device 140 may also mark, tag, or identify the primary vehicle 104a in the video feed 126 included in the sensor data 124 received from the primary vehicle 104a and/or the secondary vehicles 104b. The road anomaly detection device 140 may also mark, tag, or identify one or more secondary vehicles 104b within a threshold distance 170 from the road accident 106 that are moving toward the road accident 106 in the video feed 126 received from the primary vehicle 104a and/or one or more secondary vehicles 104b. The threshold distance 170 may be twenty feet, thirty feet, a hundred feet, or any suitable distance.

Notifying Other Vehicles about the Road Accident

The road anomaly detection device 140 may notify the vehicles 104b (or drivers of the vehicles 104b) within the threshold distance 170 from the road accident 106 that are moving toward the road accident 106 about the road accident 106. For example, the road anomaly detection device 140 may transmit an alert signal 174 to each computing device 120 associated with the vehicles 104b within the threshold distance 170 from the road accident 106 and that are moving toward the road accident 106. The alert signal 174 may include the location 128 of the road accident 106. For example, the alert signals 174 may be viewed as a pop-up notification message on a display screen or user interface of the computing device 120 visible to a driver of the vehicle 104b. The alert signal 174 may also include instructions that indicate to move to a side of the road 102 to make room for law enforcement and emergency vehicles to pass and get to the road accident 106.

In certain embodiments, alert signal 174 may include certain maneuver instructions for autonomous vehicles 104b. For example, the alert signal 174 may include electronic signals that instruct and/or cause a computing device 120 of an autonomous vehicle 104b to perform certain actions, including, but not limited to, apply breaks, change lane to a lane other than a lane occupied by the road accident 106, search for another route to reach a preset destination, take a detour, take an exit, U-turn, among others.

The road anomaly detection device 140 may also transmit other data/information to the vehicles 104b within the threshold distance 170 from the road accident 106 that are moving toward the road accident 106. For example, the road anomaly detection device 140 may transmit a particular routing recommendation 172 to each vehicle 104b based on the location of the vehicle 104b, the road accident 106, the traffic on the road 102, and any other criteria that may affect the driving experience and the traffic on the road 102. In this process, the road anomaly detection device 140 may perform the following operations for each of the vehicles 104b. The road anomaly detection device 140 may determine a location of the vehicle 104b on the road 102, e.g., from the sensor data 124 received from the vehicles 104b.

The road anomaly detection device 140 may determine the traffic and vehicles 104b movements and driving patterns from the sensor data 124 and the blockchain ledger 134. The road anomaly detection device 140 may feed the location of the vehicle 104b, the traffic on the road 102, and vehicles 104b movements and driving patterns from the sensor data 124, and the sensor data 124 to the machine learning module 176. The road anomaly detection device 140 (e.g., via the machine learning module 176) may run or execute a plurality of simulations to determine a routing recommendation 172 that is suitable and executable for each respective vehicle 104b that leads to minimizing unsafe driving and road hazard conditions on the road 102. For example, if a first vehicle 104b can take an exit before reaching the road accident 106, the routing recommendation 172 for the first vehicle 104b may indicate to take the exit. In another example, if a second vehicle 104b can take a U-turn or detour before reaching the road accident 106, the routing recommendation 172 for the second vehicle 104b may indicate to take the U-turn or detour. In another example, if a third vehicle 104b has passed all the exits and the traffic on a lane adjacent to the road accident 106 allows, the routing recommendation 172 for the third vehicle 104b may indicate to change to the adjacent lane and drive pass by the road accident 106. In another example, the routing recommendation 172 for a fourth vehicle 104b may indicate to pull over, apply breaks, and/or the like. The road anomaly detection device 140 communicates the determined routing recommendation 172 for each vehicle 104b to the respective computing device 120 of the vehicle 104b. In this manner, traffic behind the road accident 106 is reduced, minimized, or completely prevented.

Notifying Drivers of Vehicles without Wireless Communication Capability about the Road Accident The road anomaly detection device 140 is also configured to notify drivers of vehicles 104b without wireless communication capability about the road accident 106. As described in FIG. 1, some vehicles 104b may not be in signal communication with the network 110 (see FIG. 1) or base stations 112 (see FIG. 1). For example, assume that a driver of a vehicle 104b (without wireless communication capability) uses the road map navigation software application 162 that is configured to provide a map of the road 102 and turn-by-turn navigation on a display screen of a mobile device, such as a smartphone.

To notify drivers of vehicles 104b without wireless communication capability about the road accident 106, the road anomaly detection device 140 may provide access of the blockchain ledger 134 (that includes sensor data 124) to the road map monitoring device 160. In this process, the road anomaly detection device 140 may transmit an access key 222 associated with the blockchain ledger 134 to the road map monitoring device 160. The access key 222 may include a digital key or credential to access the blockchain ledger 134. In certain embodiments, the road anomaly detection device 140 may provide the access key 222 to access all blocks 212a-c (see FIG. 2). In certain embodiments, the road anomaly detection device 140 may provide the access key 222 to access one or more particular blocks 212 (see FIG. 2) that store the sensor data 124 where indications 310 of the road accident 106 are detected and stored.

In response to accessing the blockchain ledger 134, the road map monitoring device 160 may extract the location 128 of the road accident 106 and update traffic information and routing recommendations on the road map navigation software application 162 according to the blockchain ledger 134. For example, the updated traffic information and routing recommendations on the road map navigation software application 162 may reflect the road accident 106 (and traffic caused as a result of the road accident 106—if any).

The drivers driving the vehicles 104b (without wireless communication capability) may view the updated traffic information and routing recommendations on the road map navigation software application 162 on their user device, and avoid the road accident 106. In this manner, the road anomaly detection device 140 is configured to notify drivers of vehicles 104b without wireless communication capability about the road accident 106. The road map monitoring device 160 may transmit a message 318 that indicates the traffic information and routing information are updated on the road map navigation software application 162 according to the road accident 106 and the blockchain ledger 134.

Triggering a Read-Only Bit of a Video Feed Associated with the Road Accident

In certain embodiments, when the road anomaly detection device 140 determines one or more indications 310 of the road accident 106 in the sensor data 124, the road anomaly detection device 140 may instruct one or more computing devices 120 associated with vehicles 104a, b to trigger a read-only bit 312 of the video feed 126 that includes the road accident 106 happening. For example, the road anomaly detection device 140 may transmit a triggering instruction 316 to the computing devices 120 associated with vehicles 104a, b within a threshold distance (e.g., within ten feet, fifty feet, etc.) from the road accident 106. The triggering instruction 316 may include instructions to trigger a read-only bit 312 of a particular frame range of a video feed 126 that includes the road accident 106 happening. Therefore, the particular frame range of a video feed 126 that includes the road accident 106 happening may become read-only. In this way, the video feed 126 is guaranteed to be saved and not removed from a memory of the computing device 120.

Notifying Third Parties about the Road Accident

In certain embodiments, receiving multiple sensor data 124 from multiple vehicles 104a,b may increase the credibility of the sensor data 124 and the probability of the road accident 106. Therefore, if the road anomaly detection device 140 receives multiple sensor data 124 from multiple vehicles 104a,b that include indications 310 of the road accident 106, the road anomaly detection device 140 may escalate the situation. For example, the road anomaly detection device 140 may communicate a message indicating the road accident 106 to law enforcement, emergency organizations, etc.

In certain embodiments, the road anomaly detection device 140 may communicate a message indicating the road accident 106 to law enforcement, emergency organizations, etc., even in response to receiving a single sensor data 124 that includes an indication 310 of the road accident 106 received from the primary vehicle 104a or a secondary vehicle 104b.

Example Method for Road Accident Detection and Avoidance

Figure 4:
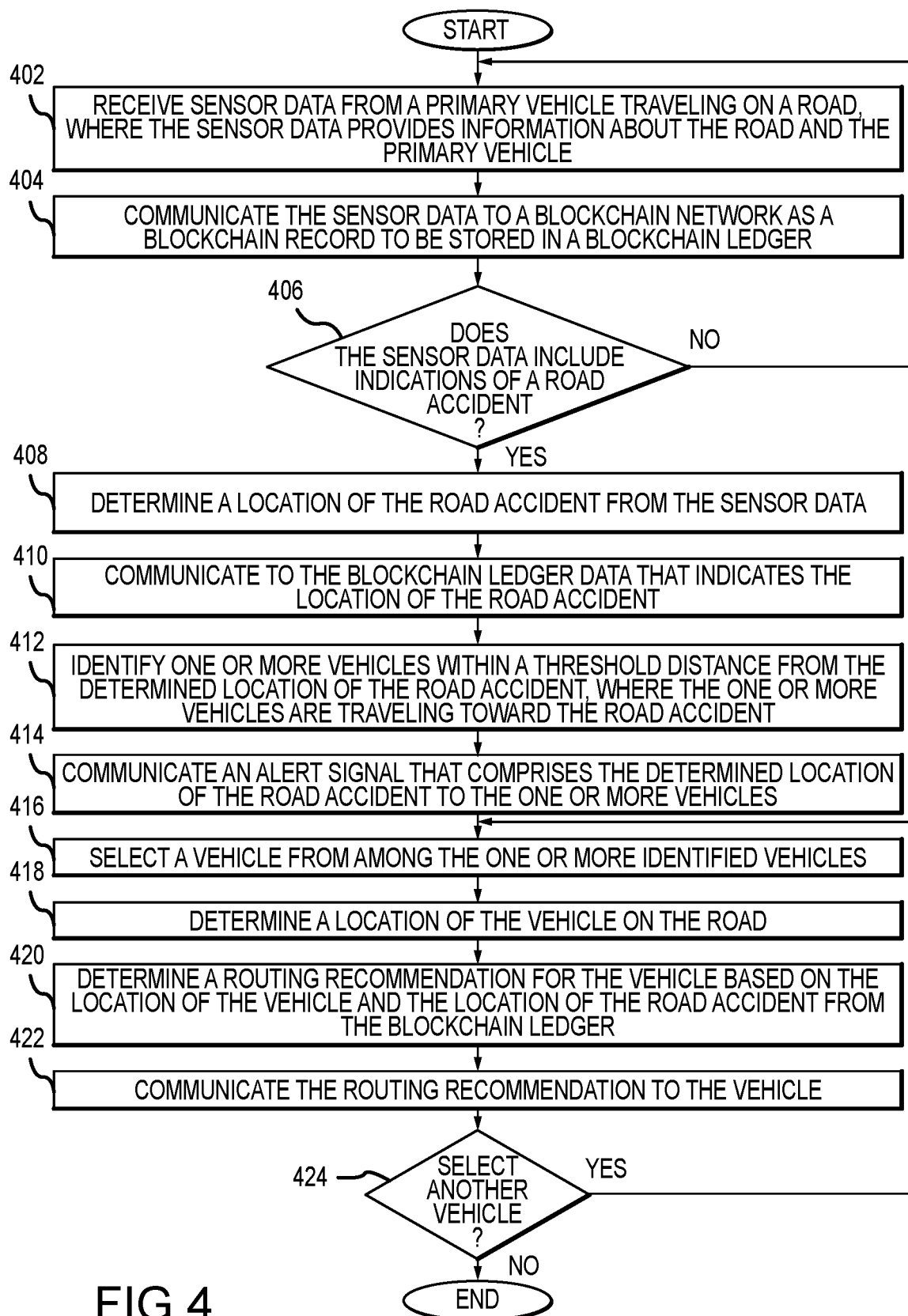
FIG. 4 illustrates an example flowchart of a method for road accident detection and avoidance.

FIG. 4 illustrates an example flowchart of a method 400 for road accident detection and avoidance. Modifications, additions, or omissions may be made to method 400. Method 400 may include more, fewer, or other operations. For example, operations may be performed in parallel or in any suitable order. While at times discussed as the system 100, road anomaly detection device 140, or components of any of thereof performing operations, any suitable system or components of the system may perform one or more operations of the method 400. For example, one or more operations of method 400 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 402-424.

At operation 402, the road anomaly detection device 140 receives sensor data 124 from a primary vehicle 104a traveling on a road 102, where the sensor data 124 provides information about the primary vehicle 104a and the road 102. For example, the road anomaly detection device 140 may receive the sensor data 124 from the computing device 120 associated with the primary vehicle 104a at predetermined intervals (e.g., every second, every five seconds, or any other suitable interval) or on-demand, similar to that described in FIG. 3. The road anomaly detection device 140 may also receive sensor data 124 from other vehicles 104b on the road 102, similar to that described in FIG. 3.

At operation 404, the road anomaly detection device 140 communicates the sensor data 124 to the blockchain network 130 as a blockchain record 216 to be stored in the blockchain ledger 134. In response, the sensor data 124 is distributed among a plurality of network nodes 132a-n of the blockchain network 130. Each network node 132a-n stores a copy of the blockchain ledger 134.

At operation 406, the road anomaly detection device 140 determines whether the sensor data 124 includes indications 310 of a road accident 106. Examples of the indications 310 of a road accident 106 are described in FIG. 3. If the road anomaly detection device 140 determines that the sensor data 124 included at least one indication 310 of a road accident 106, method 400 proceeds to operation 408. Otherwise, method 400 returns to operation 402. In this manner, the road anomaly detection device 140 may iteratively evaluate the sensor data 124 received from the primary vehicle 104a (that may have been involved in a road accident 106 and/or from one or more secondary vehicles 104b that are not involved in the road accident 106).

At operation 408, the road anomaly detection device 140 determines a location of the road accident 106 from the sensor data 124. The location of the road accident 106 may be associated with the location of the GPS location of the primary vehicle 104a that is included in the sensor data 124. In some cases, the location of the road accident 106 may correspond to the location of the primary vehicle 104a that is involved in the road accident 106.

At operation 410, the road anomaly detection device 140 communicates to the blockchain ledger 134 (and the blockchain network 130) data that indicates the location 128 of the road accident 106.

At operation 412, the road anomaly detection device 140 identifies one or more vehicles 104b within a threshold distance 170 from the determined location 128 of the road accident 106, where the one or more vehicles 104b are traveling toward the road accident 106. For example, by analyzing the sensor data 124 received from the vehicles 104b, the road anomaly detection device 140 may determine the location, speed, and trajectory of each vehicle 104b. Therefore, the road anomaly detection device 140 may determine which vehicle 104b is moving toward the road accident 106. The road anomaly detection device 140 may perform this operation for any suitable duration, for example, five minutes, ten minutes, etc. The road anomaly detection device 140 may also predict which vehicles 104b will be within the threshold distance 170 of the road accident 106 within a next threshold time period, e.g., next five minutes, ten minutes, fifteen minutes.

At operation 414, the road anomaly detection device 140 communicates an alert signal 174 that comprises the determined location 128 of the road accident 106 to the one or more identified vehicles 104b. The road anomaly detection device 140 may also communicate the alert signal 174 to other vehicles 104 that are predicted to be within the threshold distance 170 of the road accident 106 within a next threshold time period, e.g., next five minutes, ten minutes, fifteen minutes. The alert signal 174 may include any other suitable information and/or instructions. For example, the alert signal 174 may include instructions to move to a side of the road to make room for law enforcement and emergency vehicles to pass. In the same or another example, the alert signal 174 may include the extent 314 of the road accident 106, a type of road accident 106 (e.g., vehicle accident, collision with a road object, such as a road sign or traffic light, collision with a pedestrian, etc.), among other information associated with the road accident 106.

At operation 416, the road anomaly detection device 140 selects a vehicle 104b from among the one or more vehicles 104b. The road anomaly detection device 140 may iteratively select a vehicle 104b until no vehicle 104b is left for evaluation.

At operation 418, the road anomaly detection device 140 determines a location of the vehicle 104b on the road 102. For example, the road anomaly detection device 140 may determine the location of the vehicle 104b from the sensor data 124 received from the vehicle 104b, where the sensor data 124 includes a GPS location of the vehicle 104b determined by a GPS location sensor 122.

At operation 420, the road anomaly detection device 140 determines a routing recommendation 172 for the vehicle 104b based on the location of the vehicle 104b and the location 128 of the road accident 106 from the blockchain ledger 134.

In this process, the road anomaly detection device 140 may feed the location of the vehicle 104b, the traffic on the road 102 (determined from the blockchain ledger 134), movements and trajectories of vehicles 104b on the road 102, sensor data 124, and/or any other information to the routing recommendation engine 178. The routing recommendation engine 178 may perform a plurality of simulations to determine a routing recommendation 172 for the vehicle 104b such that the routing recommendation 172 leads to a safer driving experience for the vehicle 104b and other vehicles 104b and minimizes road hazards and unsafe conditions.

At operation 422, the road anomaly detection device 140 communicates the routing recommendation 172 to the vehicle 104b. In this process, the road anomaly detection device 140 may communicate the routing recommendation 172 to the computing device 120 associated with the vehicle 104b.

At operation 424, the road anomaly detection device 140 determines whether to select another vehicle 104b. The road anomaly detection device 140 may select another vehicle 104b if at least one vehicle 104b is left for evaluation from the identified one or more vehicles 104b. If the road anomaly detection device 140 determines to select another vehicle 104b, method 400 proceeds to operation 416. Otherwise, method 400 is ended.

Example System for Forming a Peer-to-Peer Network of Vehicles for Data Transmission FIG. 5 illustrates an embodiment of a system 500 that is generally configured to form a peer-to-peer network of vehicles for data transmission. FIG. 1 further illustrates an example schematic of a road 102 where vehicles 104a-d are traveling. The system 500 is configured to form a peer-to-peer network of vehicles that includes any number of vehicles 104 to establish a communication between a vehicle 104 and a base station 112. In certain embodiments, system 500 includes some or all of the components of the system 100 described in FIG. 1. In certain embodiments, system 500 may include components, in addition or instead of one or more components of the system 100 described in FIG. 1. In the illustrated embodiment, system 500 comprises a peer-to-peer network orchestrator device 540 communicatively coupled with the blockchain ledger 130, one or more computing devices 120 associated with vehicles 104a-d, and one or more base stations 112 via the network 110. Peer-to-peer network orchestrator device 540 comprises a processor 542 in signal communication with a memory 546. Memory 546 stores software instructions 548 that when executed by the processor 542 cause the peer-to-peer network orchestrator 540 to perform one or more operations described herein. The computing device 120 comprises a processor 522 in signal communication with a memory 526. Memory 526 stores software instructions 528 that when executed by the processor 522 cause the computing device 120 to perform one or more operations described herein. In other embodiments, system 500 may not have all of the components listed and/or may have other elements instead of, or in addition to, those listed above. Aspects of other components of the system 500 are described in the discussion of FIGS. 1-4. Additional aspects are described further below.

In certain embodiments, a system 100, 500 may include all or some of the components described in FIGS. 1 and 5. For example, a system may include the road anomaly detection device 140 to detect road anomalies and inform vehicles about the road anomalies and further include the peer-to-peer network orchestrator device 640 to form a peer-to-peer network of vehicles for data transmission from any vehicle (that is not successful in communicating with its respective serving base station) to a base station (either the serving base station or a neighboring base station).

In an example scenario, assume that vehicles 104a-d are traveling along the road 102, and a computing device 120 associated with the vehicle 104b becomes unsuccessful in communicating data packets 530 to the serving base station 112a. The data packets 530 may include or be associated with a cellular phone call, a streaming video data packet, or any type of stream bits of data. For example, assume that due to high network traffic to the base station 112a, the base station 112a becomes overloaded or oversubscribed. This leads to the base station 112a becoming unable to receive any further network traffic. In such cases, using the existing technology, a person (inside the vehicle 104b) who is initiating the communication with the base station 112a will have to wait until the base station 112a can accept new incoming network traffic. Currently, there is no technical solution to establish communication between the computing device 120 associated with the vehicle 104b and the serving base station 112a. In some cases, congested traffic may cause network connection dead zones. In some cases, areas with limited network coverage may be dead zones. For example, while people are stuck in traffic, they may want to make a phone call to others or use streaming services. In such situations, a number of subscribers to a serving cellular tower (e.g., base station 112) may become more than what the serving cellular tower can handle. In some cases, areas with limited network coverage may be dead zones. A computing device 120 may not be able to connect to a cellular tower or a base station 112 in dead zones. A dead zone may be an area with no or limited network coverage.

Furthermore, in some cases, one or more neighboring base stations 112, such as the base station 112b may be able to accept incoming network traffic. This leads to network load unbalance across overloaded base stations 112a and one or more neighboring base stations 112b. Currently, there is no technical solution to balance the network load and network traffic across overloaded base stations 112a and one or more neighboring base stations 112b—i.e., to reduce network traffic congestion at overloaded base stations 112a.

System 500 is configured to provide technical solutions to these technical problems by forming a peer-to-peer network of vehicles 104 that are WiFi-enabled. As such, one or more vehicles 104 may act as WiFi hotspots to relay network traffic from a vehicle 104 to another vehicle 104 or to a base station 112. In certain embodiments, the vehicles 104 in the peer-to-peer network of vehicles 104 may be configured to use any wireless protocols, such as WiFi, Bluetooth, Zigbee, local area network (LAN), any short wave protocol (e.g., wireless protocols using short wave frequency bands), any long wave protocol (e.g., wireless protocols using long wave frequency bands), and the like for data transmission.

For example, in response to determining that communication between the computing device 120 associated with the vehicle 104b and the serving base station 112a is not established, the computing device 120 associated with the vehicle 104a is configured to identify a WiFi-enabled vehicle 104 and a base station that is not overloaded (e.g., base station 112b), and transmit the data packet 530 to the WiFi-enabled vehicle 104. The WiFi-enabled vehicle 104 then may forward the data packet 530 to a base station that is not overloaded. In another example, the computing device 120 associated with the vehicle 104b may transmit the data packet 530 through one or more hops (e.g., via one or more WiFi-enabled vehicles 104) until the data packet 530 reaches a base statin 112.

In another example, in response to determining that communication between the computing device 120 associated with the vehicle 104b and the serving base station 112a is not established, the computing device 120 associated with the vehicle 104a is configured to identify a wireless communication-enabled (i.e., network-enabled) vehicle 104 and a base station that is not overloaded (e.g., base station 112b), and transmit the data packet 530 to the network-enabled vehicle 104. The network-enabled vehicle 104 then may forward the data packet 530 to a base station that is not overloaded. In another example, the computing device 120 associated with the vehicle 104b may transmit the data packet 530 through one or more hops (e.g., via one or more network-enabled vehicles 104) until the data packet 530 reaches a base statin 112.

In this manner, the system 500 is integrated into a practical application of establishing a network connection between a computing device 120 associated with the vehicle 104b and a base station 112a, b via one or more WiFi-enabled (e.g., network-enabled) vehicles 104. Furthermore, by forwarding data packets 530 to neighboring a base station 112 that is not overloaded, network congestion at overloaded base stations 112 is reduced. This provides additional practical applications of reducing network congestion at base stations 112 and network load balancing across multiple base stations 112.

Although this disclosure describes certain embodiments and examples for data transmission using WiFi, it is understood that data transmission between a vehicle 104 and another vehicle 104 and between a vehicle 104 and a base station 112 may be facilitated using any suitable wireless protocol, such as WiFi, Bluetooth, Zigbee, local area network (LAN), any short wave protocol (e.g., wireless protocols using short wave frequency bands), any long wave protocol (e.g., wireless protocols using long wave frequency bands), and the like.

System Components

Computing Device

Aspects of the computing device 120 are described in FIG. 1, and additional aspects are described below. In the present disclosure, the computing device 120 may be interchangeably referred to as a wireless device or a network node. The computing device 120 may include a processor 522 in signal communication with a network interface 524 and a memory 526.

Processor 522 may include one or more specialized and/or general-purpose processors configured to perform one or more operations of the computing device 120 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 5 may be performed using one or more processors. As such, for example, functions of participating in a peer-to-peer network of vehicles 104 and/or receiving and forwarding data packets 530 to another computing device 120 or a base station 112 may be performed by the processor 522. The processor 522 is configured to operate as described in FIGS. 1-7. For example, the processor 522 may be configured to perform one or more operations of method 700 as described in FIG. 7.

Network interface 524 is configured to enable wired and/or wireless communications. The network interface 524 communicatively couples the computing device 120 to other devices, such as other computing devices 120 associated with other vehicles 104, base stations 112a,b, some or all of the components of the system 500. The network interface 524 may communicate over any type of network topology and communication link. The network interface 144 is configured to transmit and receive data from and to other devices, for example, the network interface 144 may include a WiFi modem, a WiFi interface, a 5G modem, a 5G interface, a NR 5G modem, a NR 5G interface, a 4G modem, a 4G interface, a LTE modem, a LTE interface, a LAN modem, a LAN interface, a MAN modem, a MAN interface, a WAN modem, WAN interface, and any other suitable type of communication protocol.

The memory 526 may include a machine-readable medium having stored thereon instructions which may be used to program a computer (or other electronic devices) to perform a process. The machine-readable medium may include, but is not limited to, floppy diskettes, optical disks, CDROMs, magneto-optical disks, ROMs, RAMs, EPROMs, EEPROMs, magnetic or optical cards, flash memory, or other type of media/machine-readable medium suitable for storing electronic instructions and data. The memory 146 may store any of the information described in FIGS. 1-7 along with any other data, instructions, logic, rules, or code operable to implement the function(s) described herein when executed by processor 522. For example, the memory 526 may store software instructions 528, data packets 530, request 604, blockchain ledger 134, and/or any other data or instructions. The software instructions 528 may comprise any suitable set of instructions, logic, rules, or code operable to execute the processor 522 and perform the functions described herein, such as some or all of those described in FIGS. 1-7.

Peer-to-Peer Network Orchestrator Device

Peer-to-peer network orchestrator device 540 generally includes a hardware computing device that is configured to orchestrate a peer-to-peer network of vehicles 102 (i.e., peer-to-peer network of computing devices 120 associated with vehicles 104) for data transmission. In certain embodiments, the peer-to-peer network orchestrator device 540 may be implemented by a cluster of computing devices located in a server farm. For example, the peer-to-peer network orchestrator device 540 may be implemented by a plurality of computing devices using distributed computing and/or cloud computing systems in a network of base stations 112. In certain embodiments, the peer-to-peer network orchestrator device 540 may be implemented by a plurality of computing devices in one or more data centers. The peer-to-peer network orchestrator device 540 may be formed by one or more physical devices configured to provide services and resources (e.g., data and/or hardware resources) for the components of the system 500, such as the blockchain network 130 and the computing devices 120 associated with vehicles 104. The peer-to-peer network orchestrator device 540 comprises a processor 542 operably coupled with a network interface 544 and a memory 546.

Processor 542 may include one or more specialized and/or general-purpose processors configured to perform one or more operations of the computing device 120 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 5 may be performed using one or more processors. As such, for example, functions of participating in a peer-to-peer network of vehicles 104, receiving and forwarding data packets 530 to another computing device 120 or a base station 112 may be performed by the processor 542. The processor 542 is configured to operate as described in FIGS. 5-7. For example, the processor 542 may be configured to perform one or more operations of method 700 as described in FIG. 7.

Network interface 544 is configured to enable wired and/or wireless communications. The network interface 544 communicatively couples the peer-to-peer network orchestrator device 540 to other devices, such as computing devices 120 associated with other vehicles 104, base stations 112a,b, some or all of the components of the system 500. The network interface 524 may communicate over any type of network topology and communication link. The network interface 544 is configured to transmit and receive data from and to other devices, for example, the network interface 544 may include a WiFi modem, a WiFi interface, a 5G modem, a 5G interface, a NR 5G modem, a NR 5G interface, a 4G modem, a 4G interface, a LTE modem, a LTE interface, a LAN modem, a LAN interface, a MAN modem, a MAN interface, a WAN modem, WAN interface, and any other suitable type of communication protocol.

The memory 546 may include a machine-readable medium having stored thereon instructions which may be used to program a computer (or other electronic devices) to perform a process. The machine-readable medium may include, but is not limited to, floppy diskettes, optical disks, CDROMs, magneto-optical disks, ROMs, RAMs, EPROMs, EEPROMs, magnetic or optical cards, flash memory, or other type of media/machine-readable medium suitable for storing electronic instructions and data. The memory 546 may store any of the information described in FIGS. 1-7 along with any other data, instructions, logic, rules, or code operable to implement the function(s) described herein when executed by processor 542. For example, the memory 546 may store software instructions 548, vehicle data 550, security tokens 552, token generator 554, base station health data 556, historical communication data 558, blockchain ledger 134, and/or any other data or instructions. The software instructions 528 may comprise any suitable set of instructions, logic, rules, or code operable to execute the processor 542 and perform the functions described herein, such as some or all of those described in FIGS. 5-7.

The vehicle data 550 associated with a particular vehicle 104 comprises a GPS location of the particular vehicle 104, a WiFi capability indicator (e.g., a wireless communication capability indicator) for the particular vehicle 104, and any other data associated with the vehicle 104, such as speed, trajectory, destination, etc. The WiFi capability indicator indicates whether or not the vehicle 104 (or in other words the computing device 120 associated with the vehicle 104) is WiFi-enabled and can communicate data via WiFi. In certain embodiments, the wireless communication capability indicator indicates whether or not the vehicle 104 (or in other words the computing device 120 associated with the vehicle 104) is network-enabled and can communicate data via network 110.

The token generator 554 may be implemented by the processor 542 executing the software instructions 548, and is generally configured to generate security tokens 552. In certain embodiments, the toke generator 554 may include a hash function, a random alphanumeric string generator, an encryption function, and the like. In certain embodiments, a security token 552 may be a hash value, an alphanumeric string, and the like. The base station health data 556 associated with a base station 112 indicates whether the base station 112 is overloaded or not.

The historical communication data 558 may include the communication between computing devices 120 and base stations 112 with corresponding timestamps. For example, a particular historical communication data 558 associated with a particular vehicle 104 may indicate that a computing device 120 associated with the particular vehicle 104 was or was not able to communicate with a base station 112 at a particular timestamp.

Example Operational Flow for Forming a Peer-to-Peer Network of Vehicles

Establishing a Blockchain Ledger

Figure 6:
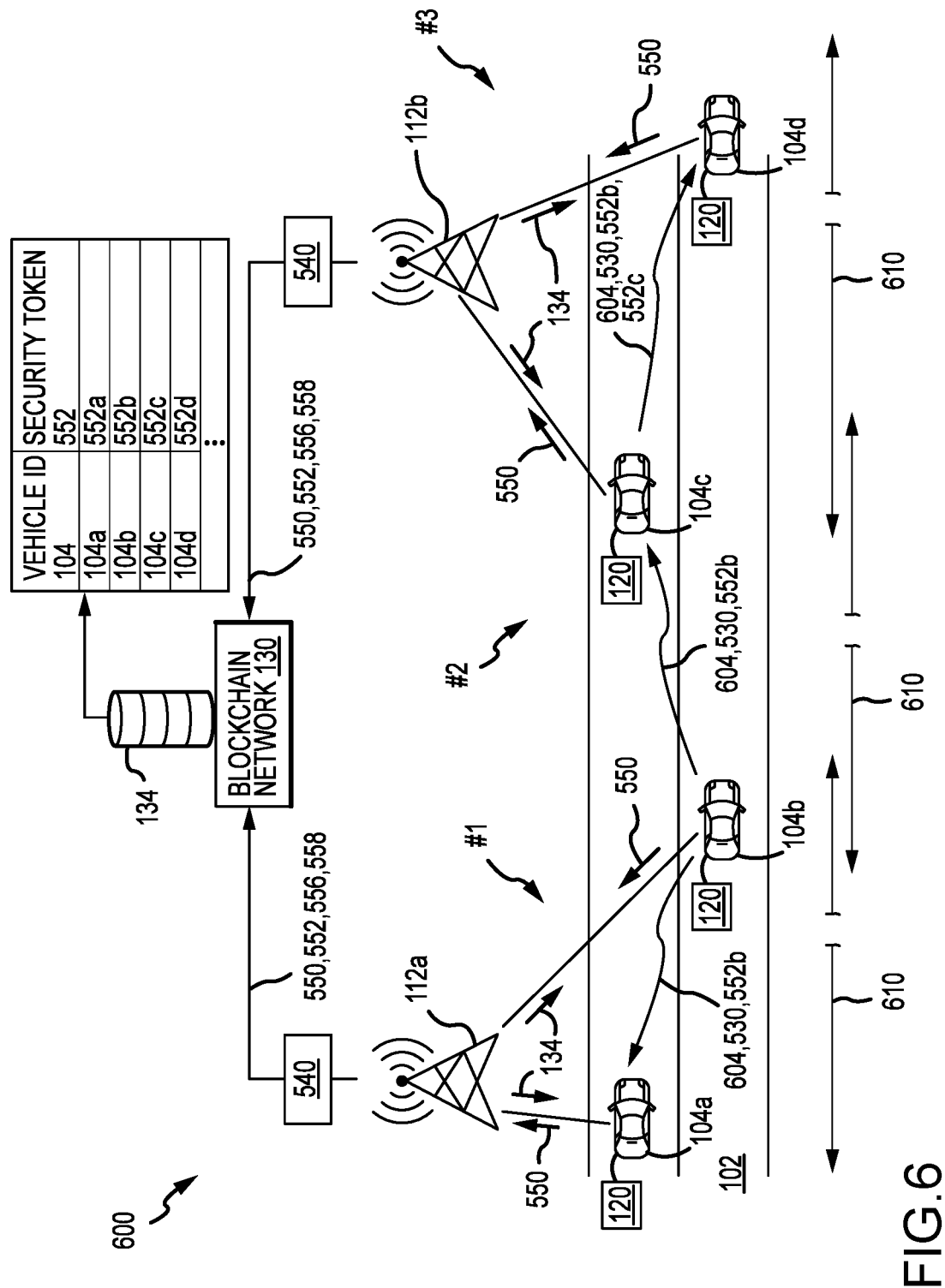
FIG. 6 illustrates an example operational flow of system of FIG. 5 for implementing a peer-to-peer network of vehicles for data transmission.

FIG. 6 illustrates an example operational flow 600 of the system 500 (see FIG. 5) for forming a peer-to-peer network of vehicles for data transmission. In an example operation, assume that vehicles 104a-d are traveling along the road 102. Also, assume that the vehicles 104a-d (at least at this point) are in communication with their respective serving base stations 112a, b.

The computing device 120 associated with each vehicle 104a-d transmits vehicle data 550 to the peer-to-peer network orchestrator device 540 via the base stations 112a, b.

The peer-to-peer network orchestrator device 540 receives the vehicle data 550 from the vehicles 104 (in another word from computing devices 120).

The peer-to-peer network orchestrator device 540 generates a plurality of security tokens 552 for the plurality of vehicles 104a-d. For example, the peer-to-peer network orchestrator device 540 may use a token generator 554 to generate the security tokens 552, similar to that described in FIG. 5. Each security token 552 uniquely identifies its respective vehicle 104. For example, the peer-to-peer network orchestrator device 540 may generate a security token 552a for vehicle 104a, security token 552b for vehicle 104b, security token 552c for vehicle 104c, and security token 552d for vehicle 104d. The peer-to-peer network orchestrator device 540 may generate other security tokens 552 for other vehicles 104. A security token 552 associated or assigned to a respective vehicle 104 indicates that the respective vehicle 104 is authorized to join a peer-to-peer network of vehicles 104 for data transmission. The security token 554 associated or assigned to a respective vehicle 104 may also indicate that the respective vehicle 104 (or the computing device 120 associated with the respective vehicle 104) is authorized to become a member of the blockchain network 130. As such, the vehicle 104 (or its computing device 120) may become a node 132 (see FIG. 5) of the blockchain network 130. In this way, the security tokens 552 may be used to establish trust and quorum among the vehicles 104 regarding forming the peer-to-peer network of vehicles 104 for data transmission.

The peer-to-peer network orchestrator device 540 establishes the blockchain ledger 134 and stores the received vehicle data 550 in the blockchain ledger 134. The peer-to-peer network orchestrator device 540 may establish the blockchain ledger 134 similar to that described in FIGS. 1-4 with respect to the road anomaly detection device 140 establishing the blockchain ledger 134. In this process, the peer-to-peer network orchestrator device 540 may communicate the vehicle data 550 to the blockchain network 130 as blockchain records 216 (see FIG. 2). Since each of the nodes 132a-n stores a copy of the blockchain ledger 134, the vehicle data 552 is distributed among the nodes 132a-n of the blockchain network 130.

The peer-to-peer network orchestrator device 540 may communicate the security tokens 554 to the blockchain network 130 as blockchain records 216 (see FIG. 2). Similarly, the security tokens 554 may be distributed among the nodes 132a-n of the blockchain network 130.

The peer-to-peer network orchestrator device 540 is also configured to determine base station health data 556 for each base station 112. For example, the peer-to-peer network orchestrator device 540 may monitor incoming and outgoing network traffic at each base station 112. The peer-to-peer network orchestrator device 540 may also monitor input and output (I/O) buffers at each base station 112. Based on the incoming and outgoing network traffic and the I/O buffers of a base station 112, the peer-to-peer network orchestrator device 540 may determine the status of the base station 112 and if the base station 112 is overloaded (e.g., oversubscribed). For example, if an operating frequency bandwidth of the base station 112 is fully occupied to facilitate network communication with current subscribers of the base station 112, the base station 112 may be overloaded and may not be able to facilitate network communication for another subscriber. A subscriber may be any device that can communicate with the base station 112, such as a computing device 120, a mobile device, and the like. When the base station health data 556 is determined, the peer-to-peer network orchestrator device 540 may store the determined base station health data 556 in the blockchain ledger 134.

The peer-to-peer network orchestrator device 540 may also store GPS locations and identifiers of the base stations 112 in the blockchain ledger 134. The peer-to-peer network orchestrator device 540 may store any other data/information in the blockchain ledger 134. For example, the peer-to-peer network orchestrator device 540 may also monitor historical communications between computing devices 120 and the base stations 112 with corresponding timestamps and determine historical communication data 558 which indicates the communication between computing devices 120 and the base stations 112 with corresponding timestamps. For example, a particular historical communication data 558 associated with the vehicle 104*a* may indicate that the computing device 120 associated with the vehicle 104*a* was able to communicate with the base station 112*a* at a particular timestamp.

The historical communication data 558 and base station health data 556 may be used by any computing device 120 to identify which base stations 112 are not overloaded and are able to accept data packets 530, for example, in a case where a base station 112 becomes overloaded or otherwise not available, a computing device 120 may be able to use this information to identify a suitable and available base station 112 for data transmission. The peer-to-peer network orchestrator device 540 may store the historical communication data 558 in the blockchain ledger 134. The peer-to-peer network orchestrator device 540 transmits a copy of the blockchain ledger 134 to the computing devices 120.

Forming a Peer-to-Peer Network of Vehicles

The system 500 of FIG. 5 is configured to form a peer-to-peer network of any number of vehicles 104 for data transmission. A particular example is described below.

The computing devices 120 associated with the vehicles 104*a*-*d* receive a copy of the blockchain ledger 134 from the peer-to-peer network orchestrator device 540. Continuing the example operation from above, assume that the base station 112*a* becomes overloaded or otherwise does not accept data packets 530 from the computing device 120 associated with the vehicle 104*b*. However, since the computing device 120 associated with the vehicle 104*b* has already received the blockchain ledger 134, it knows which vehicles 104 are WiFi-enabled, GPS locations of WiFi-enabled vehicles 104, which base stations 112 are not overloaded (i.e., can receive data packets 530), and GPS locations of the base stations 112 because this information is stored in the blockchain ledger 134 shared with the computing device 120 associated with the vehicle 104*b*.

In certain embodiments, the computing device 120 associated with the vehicle 104*b* may determine that the base station 112*a* is overloaded in response to transmitting data (e.g., data packets 530) to the base station 112*a* and not receiving an acknowledgment message from the base station 112*a*.

In an example scenario, assume that a person in the vehicle 104*b* operates the computing device 120 associated with the vehicle 104*b* to initiate a remote data communication with another person or entity (e.g., a server, a network node, a base station 112, etc.). The computing device 120 associated with the vehicle 104*b* determines that the base station 112*a* (that is the serving base station of the computing device 120 associated with the vehicle 104*b*), is overloaded, e.g., by checking the base station health data 556 associated with the base station 112*a* and/or based on not receiving an acknowledgment message from the base station 112*a*. In response, the computing device 120 associated with the vehicle 104*b* may look for another way to facilitate data communication for the person. To this end, the computing device 120 associated with the vehicle 104*b* may access the blockchain ledger 134 transmitted from the peer-to-peer network orchestrator device 540.

The computing device 120 associated with the vehicle 104*b* may identify at least one vehicle 104 with WiFi capability and that is within a WiFi range 610 from the vehicle 104*b* based on the vehicle data 550 stored in the blockchain ledger 134. The computing device 120 associated with the vehicle 104*b* may also determine which base stations 112 are not overloaded based on the base station health data 556 stored in the blockchain ledger 134.

In certain embodiments, the computing device 120 associated with the vehicle 104*b* may communicate a request 604 to the computing device 120 associated with the determined WiFi-enabled vehicle 104, where the request 604 indicates to facilitate the data communication with the base station 112 that is determined to be not overloaded. In response to the request 604 being granted, the computing device 120 associated with the vehicle 104*b* may start transmitting data packets 530 to the identified WiFi-enabled vehicle 104.

In certain embodiments, the computing device 120 associated with the vehicle 104*b* may determine the closest WiFi-enabled vehicle 104 to the vehicle 104*b* compared to distances of other WiFi-enabled vehicles 104 to the vehicle 104*b* based on the vehicle data 550, and transmit the request 604 to the computing device 120 associated with the closed WiFi-enabled vehicle 104.

In certain embodiments, the computing device 120 associated with the vehicle 104*b* may transmit the request 604 to any available WiFi-enabled vehicle 104 that is within a WiFi range 610 from the vehicle 104*b* and is accepting data communication.

In certain embodiments, the request 604 to forward the data package 530 may include routing and transfer instructions. The routing and transfer instructions in the request 604 may include any information about a chain of vehicles 104 that the data packet 530 needs to be transmitted to through hops until it reaches the designated (e.g., predetermined or prescribed) base station 112*a, b* as indicated in the request 604. The instructions in the request 604 may be indicated by data included in a data packet header that may include Internet protocol (IP) addresses of computing device(s) 120 associated with the vehicle(s) 104, identifier(s) of the vehicle(s) 104, WiFi capability indicator(s) associated with the vehicle(s) 104, and identifier of the designated base station 112*a, b*, among others. Since blocks 212 (see FIG. 2) of the blockchain 210 (see FIG. 2) stored in the blockchain ledger 134 store vehicle data 550, base station health data 556, and historical communication data 558, each computing device 120 is able to look into preceding and next blocks 212 (see FIG. 2) to determine a suitable routing and transfer path and instructions for the data transmission. In certain embodiments, the determined transfer path for the data transmission may lead to the least number of hops. In certain embodiments, the transfer path for the data transmission may be determined to optimize network bandwidth and network resource utilization. In certain embodiments, the transfer path for the data transmission may be determined to minimize network congestion at one or more access points. In certain embodiments, the transfer path for the data transmission may be determined to optimize the quality of the transmission of the received data (e.g., downlink data) from a base station 112.

As mentioned above, the data transmission may be established by one or more hops (e.g., via one or more vehicles 104). The description below describes non-limiting examples where various hops are made in a peer-to-peer network of vehicles 104 to facilitate data transmission between a vehicle 104 and with a base station 112. In these examples, it is assumed that vehicles a-d are WiFi-enabled according to their WiFi capability indicators.

Example 1: Transmitting Data Packet Through One Hop to a Designated Base Station In a first example (as indicated by #1 in FIG. 6), transmitting the data packet 530 via one hop (e.g., the vehicle 104a) to a designated base station 112a is described. In this example, assume that the computing device 120 associated with the vehicle 104b determines that the vehicle 104a is WiFi-enabled and is within the WiFi range 610 from the vehicle 104b. In response, the computing device 120 associated with the vehicle 104b transmits the request 604 to the computing device 120 associated with the vehicle 104a.

The request 604 may indicate to forward data packet 530 to a base station 112a that according to the historical communication data 558 from the blockchain ledger 134, the computing device 120 associated with the vehicle 104a is already connected to the base station 112a. The request 604 may include the data packet 530 and a security token 552b. In this particular example, the request 604 may also include routing and transfer instructions for forwarding the data packet 530 to the designated base station 112a. In this particular example, the traveling path of the data packet 530 may be indicated in the request 604 using data packet headers, IP addresses, and identifiers of the vehicle 104a and base station 112a.

The computing device 120 associated with the vehicle 104a receives the request 604. The computing device 120 associated with the vehicle 104a determines whether the security token 552b indicates the vehicle 104b is authorized to join the peer-to-peer network of vehicles 104 for data transmission. In certain embodiments, the computing device 120 associated with the vehicle 104a may determine that the security token 552b indicates the vehicle 104b is authorized to join the peer-to-peer network of vehicles 104 for data transmission by searching in the blockchain ledger 134 and in the table of vehicles 104 and their security tokens 552 to find the security token 552b, determining that the security token 552b is associated with or belongs to the vehicle 104b based on the information saved in the blockchain ledger 134, and determining that the peer-to-peer network orchestrator device 540 has assigned the security token 552b to the vehicle 104b which indicates the vehicle 104b is authorized to join the peer-to-peer network of vehicles for data transmission.

In certain embodiments, the computing device 120 associated with the vehicle 104a may determine whether the security token 552b is valid. For example, the computing device 120 associated with the vehicle 104a may determine that the security token 552b is valid based on determining that the security token 552b is generated by the peer-to-peer network orchestrator device 540. For example, the security token 552b may include information or metadata that indicates that the security token 552b is generated by the peer-to-peer network orchestrator device 540.

In response to determining that the security token 552b is valid and determining that the security token 552b indicates that the vehicle 104b is authorized by the peer-to-peer network device 540 to join the peer-to-peer network of vehicles 104, the computing device 120 associated with the vehicle 104a may grant the request 604, accept the data packet 530 from the computing device 120 associated with the vehicle 104b, and forward the data packet 530 to the base station 112a. Overwise, it does not accept the data packet 530.

Example 2: Transmitting the Data Packet Through One Hop to a Neighboring Base Station In a second example (as indicated by #2 in FIG. 6), the data communication may be established between a vehicle 104b and a neighboring base station 112b through one hop. In this example, the computing device 120 associated with the vehicle 104b may identify that the vehicle 104c is WiFi-enabled and within a WiFi range 610 from the vehicle 104b by evaluating the vehicle data 550 stored in the blockchain ledger 134. The computing device 120 associated with the vehicle 104b may also determine that the base station 112b is not overloaded based on the base station health data 556 associated with the base station 112b stored in the blockchain ledger 134.

In certain embodiments, the second example may be in response to the computing device 120 associated with the vehicle 104b determining that the serving base station 112a is overloaded, the base station 112b is not overloaded (based on the base station health data 556 in the blockchain ledger 134), and/or there is no WiFi-enabled vehicle 104 that accepts data transmission within a WiFi range 620 (based on the vehicle data 550 in the blockchain ledger 134) and that is already connected to the base station 112a (based on the historical communication data 558 in the blockchain ledger 134).

In response, the computing device 120 associated with the vehicle 104b may transmit the request 604 to the computing device 120 associated with the vehicle 104c. The request 604 may include the data packet 530 and the security token 552b. In this particular example, the request 604 may also include routing and transfer instructions for forwarding the data packet 530 to the designated base station 112b. In this particular example, the traveling path of the data packet 530 may be indicated in the request 604 using data packet headers, IP addresses, and identifiers of the vehicle 104c and base station 112b.

The computing device 120 associated with the vehicle 104c may validate the security token 552b and determine whether the security token 552b indicates that the vehicle 104b is authorized (by the peer-to-peer network orchestrator device 540) to join the peer-to-peer network of vehicles 104 for data transmission similar to that described above. If the computing device 120 associated with the vehicle 104c determines that the security token 552b is valid and that the security token 552b indicates that the vehicle 104b is authorized to join the peer-to-peer network of vehicles 104, the computing device 120 associated with the vehicle 104c accepts the data packet 530 and forwards it to the base station 112b. Overwise, it does not accept the data packet 530.

Example 3: Transmitting the Data Packet Via Multiple Hops

In a third example (as indicated by #3 in FIG. 6), the data communication between the vehicle 104b and a base station 112b may be established through multiple hops. In this example, the traveling path of the data packet 530 from the vehicle 104b may be from the vehicle 104b to the vehicle 104c, then to the vehicle 104d, and then to the base station 112b, as described below. The instructions in the request 604 may be indicated by data included in a data packet header that may include IP addresses of the computing device 120 associated with the vehicle 104c, d, identifiers of the vehicles 104c, d, WiFi capability indicators of vehicles 104d, c, an identifier of the designated base station 112b, among others.

In certain embodiments, the third example may be in response to the computing device 120 associated with the vehicle 104b determining that the serving base station 112a is overloaded, the base station 112b is not overloaded (based on the base station health data 556 in the blockchain ledger 134), there is no WiFi-enabled vehicle 104 that accepts data transmission within a WiFi range 620 (based on the vehicle data 550 in the blockchain ledger 134) and that is already connected to the base station 112a, and/or the base station 112b is connected to the computing device 120 associated with the vehicle 104d (based on the historical communication data 558 in the blockchain ledger 134).

The computing device 120 associated with the vehicle 104b may transmit the request 604 to the computing device 120 associated with the vehicle 104c. The computing device 120 associated with the vehicle 104c may forward the request 604 to the computing device 120 associated with a vehicle 104d based on the routing instructions included in the request 604. For example, the request 604 may include instructions for the computing device 120 associated with vehicle 104c to forward the request 604 to the computing device 120 associated with vehicle 104d because it is determined that the vehicle 104d is within a WiFi communication range 610 from the vehicle 104c based on the vehicle data 550 stored in the blockchain ledger 550.

The computing device 120 associated with the vehicle 104d may receive the request 604 and validate the security token 552b. In certain embodiments, the computing device 120 associated with the vehicle 104c may include the security token 552c to the request 604 before forwarding to the computing device 120 associated with the vehicle 104d. In response, the computing device 120 associated with the vehicle 104d may also validate the security token 552c similar to that described above with respect to validating the security token 552b. Upon validating the security tokens 552b, c, the computing device 120 associated with the vehicle 104d may forward the data packet 530 to the base station 112b.

Although FIG. 6 describes specific examples, one of ordinary skill in the art would recognize other embodiments. In certain embodiments, a data packet 530 may travel through any number of vehicles 104 to reach a designated base station 112a, b. In certain embodiments, some data packets 530 (from the vehicle 104b) may be transmitted through a first set of vehicles 104 to reach a first designated base station 112, and other data packets 530 (from the vehicle 104b) may be transmitted through a second set of vehicles 104 to reach a second designated base station 112. In certain embodiments, the first set of vehicles 104 may have one or more common vehicles 104 with the second set of vehicles 104. In certain embodiments, the first set of vehicles 104 may not have one or more common vehicles 104 with the second set of vehicles 104. In certain embodiments, the first designated base station 112 may be the same as the second designated base station 112. In certain embodiments, the first designated base station 112 may be different than the second designated base station 112. In certain embodiments, a request 604 may include any information, data, and instructions to indicate a network transmit path through one or move vehicles to reach a designated base station 112. In certain embodiments, a computing device 120 that originates a request 604 may formulate the transfer path of the data packet 530 through one or more WiFi-enabled vehicles 104. In certain embodiments, as the data packet 530 is transmitted among the vehicles 104 in the peer-to-peer network, the transfer path, and the peer-to-peer network may be updated dynamically (by one or more computing devices 120) according to the updated locations of the vehicles 104. For example, as vehicles 104 travel on a road 102, some vehicles 104 may enter, and other vehicles 104 may exit WiFi ranges 610 of vehicles 104. This may affect or change the data transfer path of the data packet 530 and the members of the peer-to-peer network of vehicles 104. In certain embodiments, as a request 604 is forwarded through the vehicles in a peer-to-peer network of vehicles 104, each computing device 120 may add a security token 522 associated with a respective vehicle 104 to the request 604. In this way, the next computing device 120 that receives the request 604 may also verify the security token 552 of a preceding vehicle 104 (in addition to or instead of verifying the security tokens 552 of previous vehicles before the preceding vehicle 104). Accordingly, one or more vehicles 104 may act as WiFi hotspots for other vehicles 104 to relay data packets 530 to a designated base station 112 (either a serving base station 112 or a neighboring base station 112).

In certain embodiments, vehicles 104 (e.g., computing devices 120 associated with the vehicles 104) that were able to connect to a base station 112 (e.g., to a 5G network) may act as a caching agent or caching node for vehicles 104 without 5G connectivity. For example, assume that a person in a vehicle 104b is watching a streaming service (e.g., streaming video) and encounters an area where there is limited 5G connectivity. Other vehicles 104 (e.g., any of vehicle 104a, c, d) that both have 5G connectivity and are authorized to be in the peer-to-peer mesh network can request to receive data packets associated with the streaming service (e.g., from the service provider, via base station 112), cache it locally in a memory 526, and forward the data packets to the computing device 120 associated with the vehicle 104b or to any vehicle 104 that is in the 5G dead zone. Therefore, vehicles 104 in 5G dead zone can receive the data packets for the streaming service. In the same or other examples, the data packet may not be related to a streaming service. The data packet may be related to any type of data that can be transmitted and received among devices.

In certain embodiments, a computing device 120 associated with a vehicle 104 may be configured to control and communicate cellular mobile devices within the vehicle 104, e.g., via wired and/or wireless communication, such as Bluetooth and WiFi. In an event of an emergency phone call, the cellular mobile device may be configured to connect to the vehicle 104 (or in other words, to the computing device 120) with a tagged severity level of high (e.g., 9 out of 10). The computing device 120 may tag the emergency phone call with the high severity level. The peer-to-peer network of vehicles 104 may prioritize the transmission of data packets for the emergency phone call over other network traffic to a 5G network that can establish the phone call.

Figure 7:
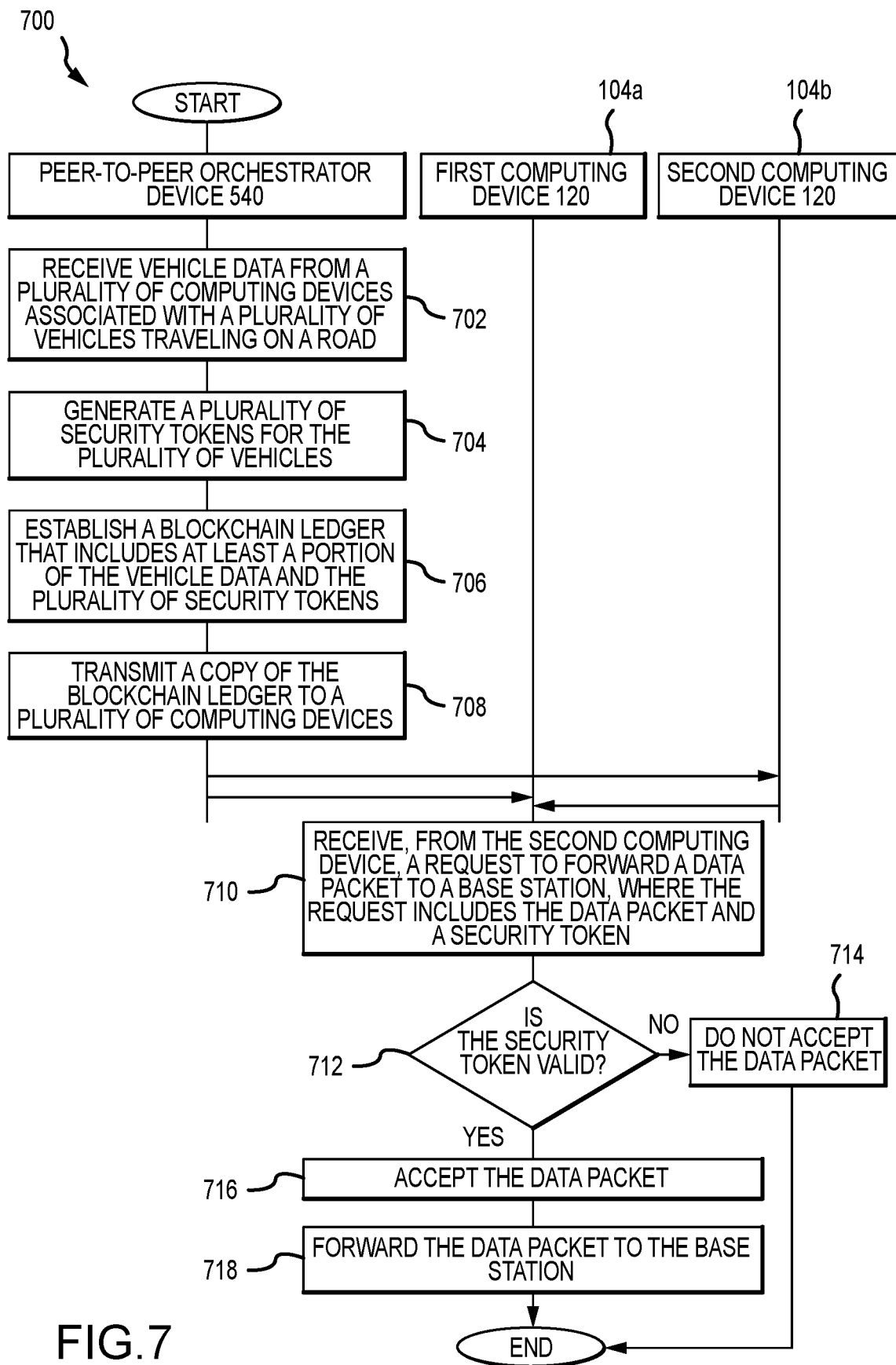
FIG. 7 illustrates an example flowchart of a method for implementing a peer-to-peer network of vehicles for data transmission.

Example Method for Forming a Peer-to-Peer Network of Vehicles for Data Transmission FIG. 7 illustrates an example flowchart of a method 700 for forming a peer-to-peer network of vehicles 104 for data transmission. Modifications, additions, or omissions may be made to method 700. Method 700 may include more, fewer, or other operations. For example, operations may be performed in parallel or in any suitable order. While at times discussed as the system 700, the computing devices 120, the peer-to-peer network orchestrator device 540, or components of any of thereof performing operations, any suitable system or components of the system may perform one or more operations of the method 700. For example, one or more operations of method 700 may be implemented, at least in part, in the form of software instructions 528, 548 of FIG. 5, stored on non-transitory, tangible, machine-readable media (e.g., memories 526, 564 of FIG. 5) that when run by one or more processors (e.g., processors 522, 542 of FIG. 5) may cause the one or more processors to perform operations 702-718.

At operation 702, the peer-to-peer network orchestrator device 540 receives vehicle data 550 from a plurality of computing devices 120 associated with a plurality of vehicles 104 traveling on a road. A particular vehicle data 550 associated with a particular vehicle 104 may include a location, WiFi capability indicator, among other information, similar to that described in FIGS. 5-6.

At operation 704, the peer-to-peer network orchestrator device 540 generates a plurality of security tokens 522 for the plurality of vehicles 104. For example, the peer-to-peer network orchestrator device 540 may generate the security tokens 552 using a token generator 554, similar to that described in FIGS. 5-6.

At operation 706, the peer-to-peer network orchestrator device 540 establishes a blockchain ledger 134 that comprises at least a portion of the vehicle data 550 and the plurality of security tokens 552. The peer-to-peer network orchestrator device 540 may establish the blockchain ledger 134 and store any other information, such as base station health data 556, and historical communication data 558, among others, similar to that described in FIGS. 5-6.

At operation 708, the peer-to-peer network orchestrator device 540 transmits a copy of the blockchain ledger 134 to the plurality of computing devices 120. In response, the computing devices 120 associated with the vehicles 104 (e.g., vehicles 104*a, b*) receive the copy of the blockchain ledger 134.

At operation 710, the first computing device 120 associated with the vehicle 104*a* receives, from the second computing device 120 associated with the vehicle 104*b*, a request 604 to forward a data packet 530 to a base station 112, where the request 604 includes the data packet 530 and a security token 552*b*. The request 604 may also include routing and transfer instructions for the data packet 530, for example, in data packet headers using IP addresses and identifiers of nodes (e.g., vehicles 104), along the transfer path of the data packet 530 until it reaches the designated base station 112, similar to that described in FIGS. 5-6.

At operation 712, the first computing device 120 associated with the vehicle 104*a* determines whether the security token 552*b* is valid. For example, the first computing device 120 associated with the vehicle 104*a* may determine that the security token 552*b* is valid in response to determining that the security token 552*b* is generated by the peer-to-peer network orchestrator 540 and/or by referring to the table of security tokens 552 in the blockchain ledger 134, similar to that described in FIGS. 5-6. The first computing device 120 associated with the vehicle 104*a* may also determine whether the security token 552*b* indicates that the vehicle 104*b* is authorized (by the peer-to-peer network orchestrator 540) to join the peer-to-peer network of vehicles 104 for data transmission, similar to that described in FIGS. 5-6. If it is determined that the security token 552*b* is valid, method 700 proceeds to operation 716. Otherwise, method 700 proceeds to operation 714.

At operation 714, the first computing device 120 associated with the vehicle 104*a* does not accept the data packet 530. At operation 716, the first computing device 120 associated with the vehicle 104*a* accepts the data packet 530. At operation 718, the first computing device 120 associated with the vehicle 104*a* forwards the data packet 530 to the base station 112.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for road accident avoidance, comprising:
 a network interface configured to receive first sensor data from a first vehicle traveling on a road, wherein the first sensor data provides information about the road and the first vehicle;
 a first processor operably coupled to the network interface, and configured to:
  generate a security token for the first vehicle, wherein the security token indicates that the first vehicle is an authorized member of a blockchain network,
 wherein the security token is maintained in a blockchain ledger associated with the blockchain network;
  communicate the first sensor data to the blockchain network as the blockchain record to be stored in a blockchain ledger, such that the first sensor data is distributed among a plurality of network nodes within the blockchain network, wherein each network node from among the blockchain network stores a copy of the blockchain ledger;
  determine that a portion of the first sensor data comprises an indication of a road accident, wherein the first sensor data comprises a temperature sensor data, and the indication of the road accident comprises an increase in temperature detected in the temperature sensor data;
  determine a location of the road accident from the first sensor data, wherein the location of the road accident is associated with the location of the first vehicle included in the first sensor data;

communicate, to the blockchain ledger, data that indicates the location of the road accident;

identify one or more vehicles within a threshold distance from the determined location of the road accident, wherein the identified one or more vehicles are traveling toward the road accident;

communicate an alert signal that comprises the determined location of the road accident to the one or more identified vehicles;

for a second vehicle from among the one or more vehicles:
determine a location of the second vehicle on the road;
determine, based at least in part upon the location of the second vehicle and the location of the road accident from the blockchain ledger, a routing recommendation for the second vehicle, wherein determining the routing recommendation for the second vehicle comprises:
executing a plurality of driving simulations for the second vehicle;
determining, based at least in part upon the plurality of driving simulations and road conditions, a traveling path for the second vehicle that traffic allows and leads to avoiding the road accident, wherein the traveling path is associated with the routing recommendation; and
communicate the routing recommendation to the second vehicle, wherein the second vehicle is controlled according to the routing recommendation.

2. The system of claim 1, wherein the first sensor data comprises at least one of the following:
the location of the first vehicle;
a trajectory of the first vehicle;
a speed of the first vehicle; or a video feed that shows at least a portion of the road.

3. The system of claim 1, wherein the first processor is further configured to:
receive a second sensor data from one or more secondary vehicles that have witnessed the road accident, wherein the second sensor data indicates at least one of the following:
at least one vehicle has stopped behind the road accident;
at least one vehicle has slowed down at a location where there is no traffic or stop sign;
at least one vehicle has taken a detour to avoid the road accident;
determine an extent of the road accident based at least in part upon the first sensor data and the second sensor data;
associate data indicating the extent of the road accident to the portion of the first sensor data; and
communicate the second sensor data to the blockchain network as a second blockchain record to be stored in the blockchain ledger.

4. The system of claim 1, further comprising:
the first vehicle comprising:
at least one sensor configured to capture the first sensor data;
a second processor, operably coupled to the at least one sensor, and configured to communicate the first sensor data to the first processor.

5. The system of claim 4, wherein the first processor is further configured, in response to determining that the portion of the first sensor data comprises the indication of the road accident, to instruct the second processor to trigger the portion of the first sensor data to become read-only.

6. The system of claim 4, wherein the at least one sensor comprises a camera sensor, a temperature sensor, a proximity sensor, a motion sensor, a collision sensor, or an airbag sensor.

7. The system of claim 1, wherein the indication of the road accident comprises at least one of the following:
a first piece of the portion of the first sensor data that indicates an airbag has deployed; or
a second piece of the portion of the first sensor data that indicates an impact with an object.

8. A method for road accident avoidance, comprising:
generating a security token for a first vehicle, wherein the security token indicates that the first vehicle is an authorized member of a blockchain network, wherein the security token is maintained in a blockchain ledger associated with the blockchain network;
receiving first sensor data from the first vehicle traveling on a road, wherein the first sensor data provides information about the road and the first vehicle;
communicating the first sensor data to the blockchain network as the blockchain record to be stored in a blockchain ledger, such that the first sensor data is distributed among a plurality of network nodes within the blockchain network, wherein each network node from among the blockchain network stores a copy of the blockchain ledger;
determining that a portion of the first sensor data comprises an indication of a road accident, wherein the first sensor data comprises a temperature sensor data, and the indication of the road accident comprises an increase in temperature detected in the temperature sensor data;
determining a location of the road accident from the first sensor data, wherein the location of the road accident is associated with the location of the first vehicle included in the first sensor data;
communicating, to the blockchain ledger, data that indicates the location of the road accident;
identifying one or more vehicles within a threshold distance from the determined location of the road accident, wherein the identified one or more vehicles are traveling toward the road accident;
communicating an alert signal that comprises the determined location of the road accident to the one or more identified vehicles;
for a second vehicle from among the one or more vehicles:
determining a location of the second vehicle on the road;
determining, based at least in part upon the location of the second vehicle and the location of the road accident from the blockchain ledger, a routing recommendation for the second vehicle; and
communicating the routing recommendation to the second vehicle, wherein the second vehicle is controlled according to the routing recommendation.

9. The method of claim 8, wherein the first sensor data comprises at least one of the following:
the location of the first vehicle;
a trajectory of the first vehicle;
a speed of the first vehicle; or
a video feed that shows at least a portion of the road.

10. The method of claim 8, further comprising:
receiving a second sensor data from one or more secondary vehicles that have witnessed the road accident, wherein the second sensor data indicates at least one of the following:
at least one vehicle has stopped behind the road accident;
at least one vehicle has slowed down at a location where there is no traffic or stop sign;
at least one vehicle has taken a detour to avoid the road accident;
determining an extent of the road accident based at least in part upon the first sensor data and the second sensor data;
associating data indicating the extent of the road accident to the portion of the first sensor data; and
communicating the second sensor data to the blockchain network as a second blockchain record to be stored in the blockchain ledger.

11. The method of claim 8, wherein the routing recommendation comprises:
taking a detour; or
passing by a road anomaly.

12. The method of claim 8, wherein the alert signal further comprises instructions that indicate to move to a side of the road to make room for law enforcement and emergency vehicles to pass.

13. The method of claim 8, further comprising:
providing a road map monitoring device associated with the second vehicle access to the location of the road accident from the blockchain ledger, wherein:
the road map monitoring device comprises a processor that is configured to:
provide a road map navigation software application that shows a map that includes the road on a graphical user interface; and
display traffic information associated with the road on the road map navigation software application; and
in response to accessing the blockchain ledger, the processor extracts the location of the road accident from the blockchain ledger and updates the traffic information according to the road accident;
receiving, from the road map monitoring device, a message that indicates the traffic information is updated on the road map navigation software application according to the road accident.

14. The method of claim 8, wherein the indication of the road accident comprises at least one of the following:
a first piece of the portion of the first sensor data that indicates an airbag has deployed; or
a second piece of the portion of the first sensor data that indicates an impact with an object.

15. A non-transitory computer-readable medium that stores instructions, wherein when the instructions are executed by one or more processors, cause the one or more processors to:
generate a security token for a first vehicle, wherein the security token indicates that the first vehicle is an authorized member of a blockchain network, wherein the security token is maintained in a blockchain ledger associated with the blockchain network;
receive first sensor data from the first vehicle traveling on a road, wherein the first sensor data provides information about the road and the first vehicle;
communicate the first sensor data to the blockchain network as the blockchain record to be stored in a blockchain ledger, such that the first sensor data is distributed among a plurality of network nodes within the blockchain network, wherein each network node from among the blockchain network stores a copy of the blockchain ledger;
determine that a portion of the first sensor data comprises an indication of a road accident, wherein the first sensor data comprises a temperature sensor data, and the indication of the road accident comprises an increase in temperature detected in the temperature sensor data;
determine a location of the road accident from the first sensor data, wherein the location of the road accident is associated with the location of the first vehicle included in the first sensor data;
communicate, to the blockchain ledger, data that indicates the location of the road accident;
identify one or more vehicles within a threshold distance from the determined location of the road accident, wherein the identified one or more vehicles are traveling toward the road accident;
communicate an alert signal that comprises the determined location of the road accident to the one or more identified vehicles;
for a second vehicle from among the one or more vehicles:
determine a location of the second vehicle on the road;
determine, based at least in part upon the location of the second vehicle and the location of the road accident from the blockchain ledger, a routing recommendation for the second vehicle; and
communicate the routing recommendation to the second vehicle, wherein the second vehicle is controlled according to the routing recommendation.

16. The non-transitory computer-readable medium of claim 15, wherein the first sensor data comprises at least one of the following:
the location of the first vehicle;
a trajectory of the first vehicle;
a speed of the first vehicle; or
a video feed that shows at least a portion of the road.

17. The non-transitory computer-readable medium of claim 15, wherein the instructions when executed by the one or more processors, further cause the one or more processors to:
receive a second sensor data from one or more secondary vehicles that have witnessed the road accident, wherein the second sensor data indicates at least one of the following:
at least one vehicle has stopped behind the road accident;
at least one vehicle has slowed down at a location where there is no traffic or stop sign;
at least one vehicle has taken a detour to avoid the road accident;
determine an extent of the road accident based at least in part upon the first sensor data and the second sensor data;
associate data indicating the extent of the road accident to the portion of the first sensor data; and
communicate the second sensor data to the blockchain network as a second blockchain record to be stored in the blockchain ledger.

18. The non-transitory computer-readable medium of claim 15, wherein the instructions when executed by the one or more processors, further cause the one or more processors to:

provide a road map monitoring device associated with the second vehicle access to the location of the road accident from the blockchain ledger, wherein:
- the road map monitoring device comprises a processor that is configured to:
  - provide a road map navigation software application that shows a map that includes the road on a graphical user interface; and
  - display traffic information associated with the road on the road map navigation software application; and
- in response to accessing the blockchain ledger, the processor extracts the location of the road accident from the blockchain ledger and updates the traffic information according to the road accident;

receive, from the road map monitoring device, a message that indicates the traffic information is updated on the road map navigation software application according to the road accident.

19. The non-transitory computer-readable medium of claim 15, wherein the first sensor data is captured by a camera sensor, a temperature sensor, a proximity sensor, a motion sensor, a collision sensor, or an airbag sensor.

20. The non-transitory computer-readable medium of claim 15, wherein the indication of the road accident comprises at least one of the following:
- a first piece of the portion of the first sensor data that indicates an airbag has deployed; or
- a second piece of the portion of the first sensor data that indicates an impact with an object.

* * * * *